(12) United States Patent
Jun et al.

(10) Patent No.: US 11,792,545 B2
(45) Date of Patent: Oct. 17, 2023

(54) ELECTRONIC CIRCUIT FOR COMPENSATING A VOLTAGE LEVEL AGAINST A VARIATION OF TEMPERATURE, AND AN IMAGE SENSOR INCLUDING THE SAME

(71) Applicant: SAMSUNG ELECTRONICS CO., LTD., Suwon-si (KR)

(72) Inventors: Jaehoon Jun, Suwon-si (KR); Han Yang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/678,268

(22) Filed: Feb. 23, 2022

(65) Prior Publication Data

US 2023/0020850 A1 Jan. 19, 2023

(30) Foreign Application Priority Data

Jul. 7, 2021 (KR) .................. 10-2021-0088933

(51) Int. Cl.
*H04N 25/709* (2023.01)
*H04N 25/75* (2023.01)

(52) U.S. Cl.
CPC ........... *H04N 25/709* (2023.01); *H04N 25/75* (2023.01)

(58) Field of Classification Search
CPC .... H04N 25/766; H04N 25/59; H04N 25/616; H04N 25/75; H04N 25/771; H04N 25/625; H04N 25/709; H04N 25/74
See application file for complete search history.

(56) References Cited

U.S. PATENT DOCUMENTS

| 7,911,261 B1 * | 3/2011 | Shamarao | G05F 3/08 327/535 |
| 8,748,791 B2 | 6/2014 | Lee et al. | |
| 8,866,060 B2 | 10/2014 | Kwon et al. | |
| 9,338,381 B2 | 5/2016 | Kondo | |

(Continued)

FOREIGN PATENT DOCUMENTS

KR 10-2020-0001165 1/2020

OTHER PUBLICATIONS

Minki Cho et al., "Post-Silicon Voltage Guard-Band Reduction in a 22 nm Graphics Execution Core Using Adaptive Voltage Scaling and Dynamic Power Gating", IEEE JSSC, vol. 52, No. 1, Jan. 2017.

*Primary Examiner* — Mekonnen D Dagnew
(74) *Attorney, Agent, or Firm* — F. CHAU & ASSOCIATES, LLC

(57) ABSTRACT

An image sensor including: a pixel array including first and second pixels connected to a column line; a row driver to provide the first pixel with a first selection signal based on a clamp voltage, and to provide the second pixel with a second selection signal based on a selection voltage, wherein the first pixel outputs a first output voltage in response to the first selection signal, and the second pixel outputs a second output voltage in response to the second selection signal, wherein the first and second output voltages are output as a pixel signal through the column line, wherein a voltage of the pixel signal corresponds to a voltage obtained by clamping the second output voltage with the first output voltage, and wherein a change in a voltage level of the first output voltage due to a temperature is compensated for by the clamp voltage.

20 Claims, 18 Drawing Sheets

(56) References Cited

U.S. PATENT DOCUMENTS

| | | |
|---|---|---|
| 9,549,135 B2 | 1/2017 | Kito et al. |
| 9,967,502 B2 | 5/2018 | Matsumoto et al. |
| 10,165,210 B1 | 12/2018 | Wang et al. |
| 10,523,885 B2 | 12/2019 | Saha et al. |
| 2011/0221931 A1 | 9/2011 | Wakabayashi et al. |
| 2017/0126997 A1* | 5/2017 | Ha ................... H04N 25/589 |
| 2019/0158722 A1* | 5/2019 | Jung .................. H04N 23/698 |
| 2020/0007808 A1 | 1/2020 | Jung et al. |
| 2021/0099656 A1 | 4/2021 | Cho et al. |
| 2021/0337154 A1 | 10/2021 | Jung et al. |

\* cited by examiner

# ELECTRONIC CIRCUIT FOR COMPENSATING A VOLTAGE LEVEL AGAINST A VARIATION OF TEMPERATURE, AND AN IMAGE SENSOR INCLUDING THE SAME

CROSS-REFERENCE TO R ELATED APPLICATION

This application claims priority under 35 U.S.C. § 119 to Korean Patent Application No. 10-2021-0088933 filed on Jul. 7, 2021, in the Korean Intellectual Property Office, the disclosure of which is incorporated by reference herein in its entirety.

TECHNICAL FIELD

Embodiments of the present disclosure relate to an electronic circuit that compensates for a change in a voltage level due to a temperature change and an image sensor including the same, and more particularly, to an electronic circuit that generates a pixel signal insensitive to a temperature change and an image sensor including the same.

DISCUSSION OF RELATED ART

An image sensor is a sensor that detects and conveys information used to make an image. The image sensor includes an electronic circuit for sensing light. The image sensor is used in an electronic device such as a camera, a scanner, or a smartphone. The two main types of image sensors include a charge coupled device (CCD) image sensor and a complementary metal-oxide semiconductor (CMOS) image sensor (CIS). Cameras integrated in small consumer electronic products such as a smartphone include the CMOS image sensor.

Because unit pixels of the CMOS image sensor are manufactured by a fine process, a noise due to coupling may occur. A smear like horizontal noise (SHBN) is a type of noise that occurs in the CMOS image sensor. The SHBN is a noise of a fixed horizontal pattern due to the coupling, between adjacent pixels.

In the case where an image sensor senses a bright light source in a low-luminance environment, an image including a fixed pattern of a band shape may be output. To prevent this from happening, an unused pixel may be continuously used to operate as a clamp circuit. However, a transistor(s) in a pixel may cause voltage variations due to a temperature change, thereby restricting a dynamic range of an analog-to-digital converter (ADC).

SUMMARY

Embodiments of the present disclosure provide an electronic circuit for generating a pixel signal insensitive to a temperature change in a situation in which some pixels of a pixel array operate as a clamp circuit and an image sensor including the same.

According to an embodiment of the present disclosure, an image sensor includes: a pixel array including a first pixel and a second pixel, wherein the first pixel and the second pixel are connected to a column line; a row driver configured to provide the first pixel with a first selection signal based on a clamp voltage, and to provide the second pixel with a second selection signal based on a selection voltage, wherein the first pixel outputs a first output voltage in response to the first selection signal, and the second pixel outputs a second output voltage in response to the second selection signal, wherein the first output voltage and the second output voltage are output as a pixel signal through the column line, wherein a voltage of the pixel signal corresponds to a voltage obtained by clamping the second output voltage with the first output voltage, and wherein a change in a voltage level of the first output voltage due to a temperature is compensated for by the clamp voltage.

According to an embodiment of the present disclosure, an electronic circuit includes: a clamp voltage generating circuit configured to generate a first voltage, wherein a voltage level of the first voltage decreases as a temperature increases and a transistor configured to output a second voltage based on the first voltage, wherein a voltage level of a threshold voltage of the transistor decreases as the temperature increases, wherein a change in a voltage level of the second voltage, which results from a change in the temperature, is compensated for by using the first voltage.

According to an embodiment of the present disclosure, an operating method of an electronic device includes: generating a clamp voltage, wherein a voltage level of the clamp voltage decreases as a temperature increases; applying the clamp voltage to a transistor, wherein a voltage level of a threshold voltage of the transistor decreases as the temperature increases; and compensating for a change in a voltage level of an output voltage of the transistor, which is due to a change in the threshold voltage, based on the clamp voltage.

DESCRIPTION OF THE FIGURES

The above and other features of the present disclosure will become apparent by describing in detail embodiments thereof with reference to the accompanying drawings.

DETAILED DESCRIPTION OF THE EMBODIMENTS

Figure 1:
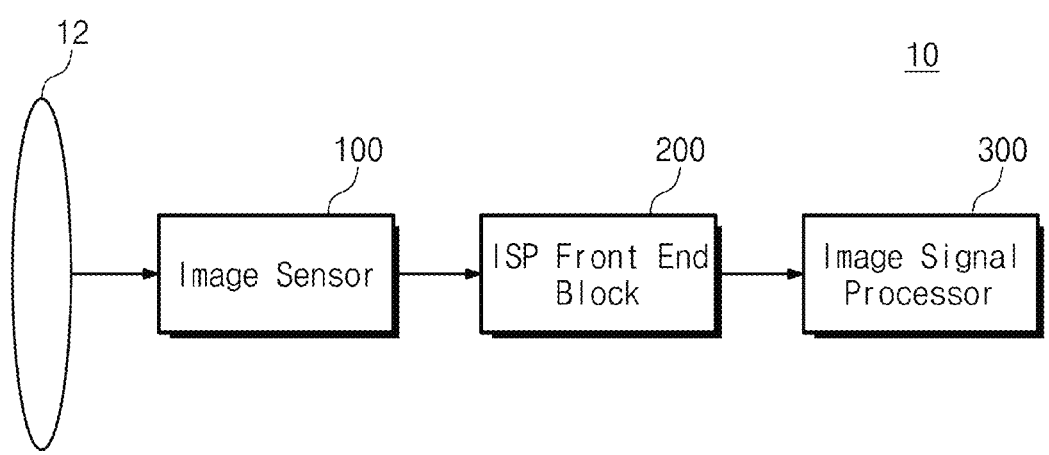
FIG. 1 is a configuration diagram illustrating an image processing device according to an embodiment of the present disclosure.

Below, embodiments of the present disclosure will be described in detail and clearly to such an extent that one skilled in the art can carry out the present disclosure.

In the detailed description, components described with reference to the terms "unit", "module", "block", "~er or ~or", etc. and function blocks illustrated in the drawings will be implemented with software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

In the specification, the terms "clamp" and "clamping" are used. The terms "clamp" and "clamping" may mean to adjust, maintain, and control a level of an output voltage output from an electronic circuit and the like to have a level similar to a reference level. In the specification, the term "clamp circuit" is used. The term "clamp circuit" may mean an electronic circuit configured to perform the "clamp" or "clamping".

FIG. 1 is a configuration diagram illustrating an image processing device according to an embodiment of the present disclosure. An image processing device 10 may be implemented as a part of various electronic devices such as a smartphone, a digital camera, a laptop computer, and a desktop computer. The image processing device 10 may include a lens 12, an image sensor 100, an image signal processor (ISP) front end block 200, and an image signal processor 300.

The lens 12 may receive a light reflected by an object, a scenery, etc. targeted for photographing. The lens 12 may move, for example, through an actuator. When a position of the lens 12 varies depending on the movement of the lens 12, a focal distance of the lens 12 may change. As such, the focus on the object may be adjusted.

The image sensor 100 may include normal pixels for obtaining color information about the object. The normal pixels of the image sensor 100 may generate an electrical signal based on the light received through the lens 12. In addition, the image sensor 100 may include phase detection pixels for obtaining phase information about the object. The image sensor 100 may include phase detection pixels for adjusting a focal distance. The phase detection pixels of the image sensor 100 may generate an electrical signal, which is used to perform phase detection auto-focus (PDAF), based on the light received through the lens 12. The image sensor 100 may output image data including color information and phase information about the object. A configuration and an operation of the image sensor 100 will be described in detail with reference to FIG. 2.

The ISP front end block 200 may perform various pre-processing operations on a signal output from the image sensor 100. The ISP front end block 200 may perform the following processing on the signal output from the image sensor 100: crosstalk compensation and auto dark level compensation (ADLC) for reproving a fixed pattern noise (FPN).

The image signal processor 300 may perform various processing operations on data processed by the ISP front end block 200. For example, the image signal processor 300 may perform various processing operations such as color interpolation, auto white balance, gamma correction, color saturation correction, formatting, bad pixel correction, and hue correction.

FIG. 1 shows one lens one image sensor 100, and one ISP front end block 200. However, in another embodiment, the image processing device 10 may include a plurality of lenses, a plurality of image sensors, and a plurality of ISP front end blocks. In this case, the plurality of lenses may have different fields of view (FOV), respectively. In addition, the plurality of image sensors may have different functions, different performances, and/or different characteristics, and may respectively include pixel arrays of different configurations.

Figure 2:
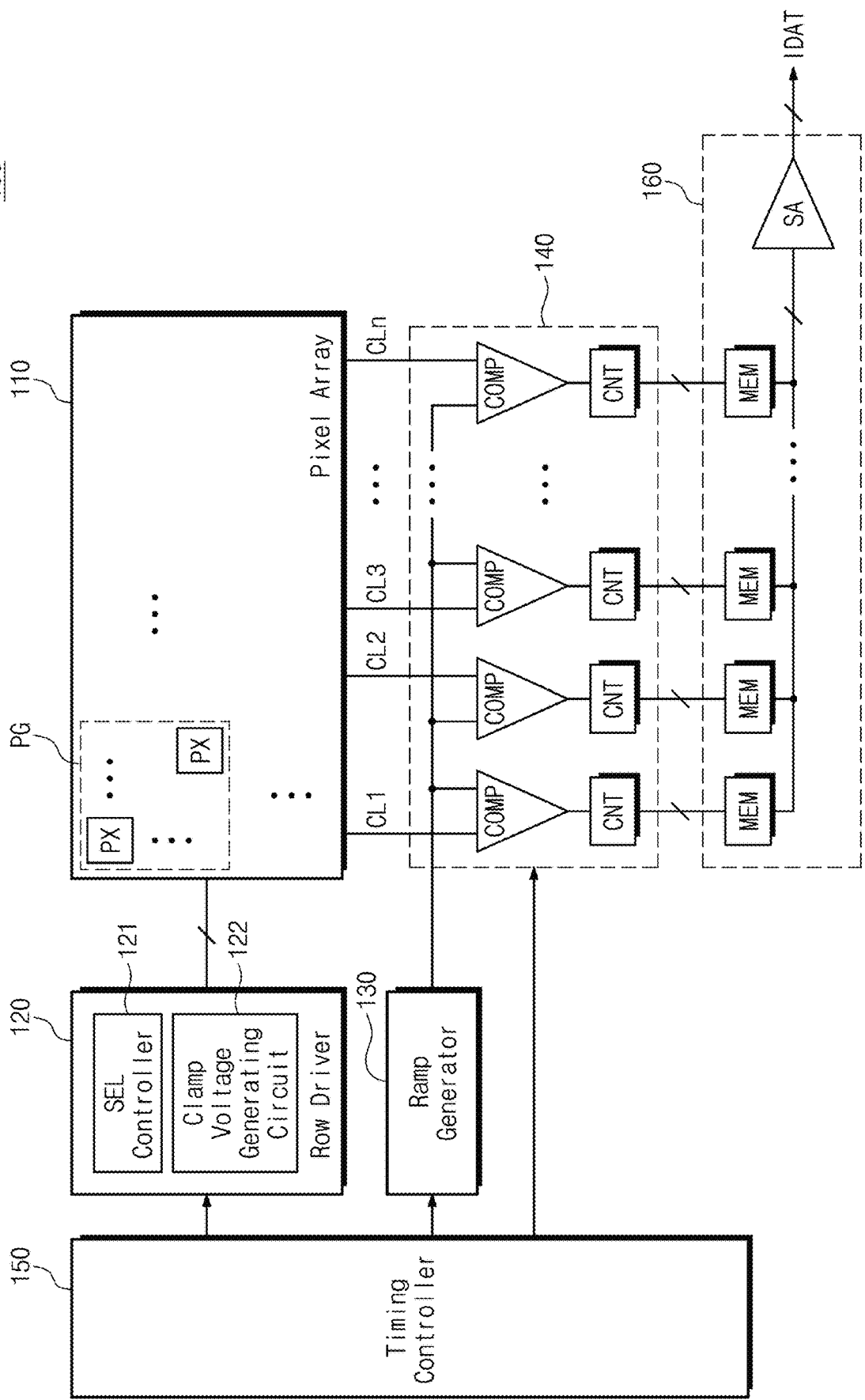
FIG. 2 is a configuration diagram illustrating an image sensor of FIG. 1 in more detail.

FIG. 2 is a configuration diagram illustrating the image sensor 100 of FIG. 1 in more detail. The image sensor 100 may include a pixel array 110, a row driver 120, a ramp signal generator 130, an analog-to-digital converting block (hereinafter referred to as an "ADC block") 140, a timing controller 150, and a buffer 160.

The pixel array 110 may include a plurality of pixels PX arranged in rows and columns, in other words, in the term of a matrix. Each of the plurality of pixels PX may include a photoelectric conversion element. Each of the plurality of pixels PX may sense a light by using the photoelectric conversion element and may convert the sensed light into an electrical signal (hereinafter referred to as a "pixel signal"). For example, the photoelectric conversion element may include a photo diode, a photo transistor, a photo gate, a pinned photo diode, or the like.

The plurality of pixels PX constituting the pixel array 110 may be divided into a plurality of pixel groups PG. Each pixel group PG ma include two or more pixels PX. In an embodiment of the present disclosure, the pixel group PG may include nine pixels PX arranged in three rows and three columns or may include four pixels PX arranged in two rows and two columns. However, the number of pixels PX constituting the pixel group PG is not limited thereto.

Pixels PX constituting the pixel group PG may share at least one floating diffusion region or two or more floating diffusion regions. For example, the pixels PX constituting the pixel group PG may share only one floating diffusion region. In this case, outputs of the pixels PX of each pixel group PG may be provided through one column line (e.g., CL1). Alternatively, the pixels PX constituting the pixel group PG may share a plurality of floating diffusion regions. For example, in the pixel group PG, pixels PX belonging to a first column may share a first floating diffusion region, pixels PX belonging to a second column may share a second floating diffusion region, and pixels PX belonging to a third column may share a third floating diffusion region. In this case, in the pixel group PG illustrated in FIG. 2, the pixels PX belonging to the first column may be output in common through the column line CL1 the pixels PX belonging to the second column may be output in common through a column line CL2, and the pixels PX belonging to the third column may be output in common through a column line CL3.

The pixel group PG may include pixels PX of the same type for outputting information about the same color. For example, the pixel group PG may include red pixels "R" to convert light of a red spectrum into an electrical signal, green pixels "Gr/Gb" to convert light of a green spectrum into an electrical signal, or blue pixels "B" to convert light of a blue spectrum into an electrical signal. To accomplish this, a plurality of color filters may be formed on/over the pixel groups PG, and thus, a multi-color filter array (multi-CFA) may be implemented.

The row driver 120 may select and drive a row of the pixel array 110. The row driver 120 may decode an address and/or a control signal generated by the timing controller 150 and may generate control signals for selecting and driving a row of the pixel array 110. For example, the control signals may include a signal for selecting a pixel, a signal for resetting a floating diffusion region, a signal for selecting a column line, and the like.

The row driver 120 according to an embodiment of the present disclosure may include a selection controller 121 and a clamp voltage generating circuit (or clamp voltage module) 122. The selection controller 121 may generate control signals for selecting a row of the pixel array 110 and control signals for outputting a clamp voltage. A configuration and an operation of the selection controller 121 will be described in detail with reference to FIGS. 3 and 4A. The clamp voltage generating circuit 122 may generate a clamp voltage. FIG. 2 shows an example in which the clamp voltage generating circuit 122 is included in the row driver 120, but the present disclosure is not limited thereto. For example, the clamp voltage generating circuit 122 may be provided outside the row driver 120. A configuration and an operation of the clamp voltage generating circuit 122 will be described in detail with reference to FIGS. 6, 9, and 11 to 13.

The ramp signal generator 130 may generate a ramp signal. The ramp signal generator 130 may operate under control of the timing controller 150. For example, the ramp signal generator 130 may operate in response to control signals such as a ramp enable signal and a mode signal provided from the timing controller 150. When the ramp enable signal is activated, the ramp signal generator 130 may generate the ramp signal that has a slope set based on the mode signal.

The ADC block 140 may convert an analog signal (e.g., a pixel signal) output from the pixel array 110 into a digital signal. In an embodiment of the present disclosure, the ADC block 140 may include a plurality of ADCs, each of which includes a comparator COMP and a counter CNT. The comparator COMP may compare a pixel signal output through a column line (e.g., one of CL1 to CLn) connected with the comparator COMP with the ramp signal and may output a comparison result. The comparator COMP may operate based on a correlated double sampling (CDS) technique for obtaining a reset signal and an image signal from a pixel signal and extracting a difference between the reset signal and the image signal as an effective signal component.

The counter CNT may count pulses of an output signal of the corresponding comparator COMP. In other words, the counter CNT may count pulses of the output signal of the comparator COMP to which it is connected. For example, the counter CNT may operate in response to various control signals, which are generated by the timing controller 150, such as a counter clock signal, a counter reset signal for controlling a reset of the counter CNT, and an inversion signal for inverting an internal hit of the counter CNT. The counter CNT may count a comparison result signal depending on the counter clock signal and may output a digital signal as a counting result.

The counter CNT may include an up/down counter, a bit-wise inversion counter, and the like. An operation of the bit-wise counter may be to an operation of the up/down counter. Far example, the bit-wise counter may perform a function of performing only up-counting and a function of converting all internal bits of the counter to obtain the 1's complement when a specific signal is received. The bit-wise counter may perform a reset count and may then invert a result of the reset count to the 1's complement, in other words, a negative value.

The timing controller 150 may generate a control signal and/or a clock for controlling an operation and/or a timing of each of the row driver 120, the ramp swarm generator 130, and the ADC block 140 (e.g., the counter CNT).

The buffer 160 may include a plurality of memories MEMs and a sense amplifier SA. Each of the plurality of memories MEMs may store a digital signal output from a corresponding ADC. The sense amplifier SA may sense and amplify the digital signals stored in the memories MEMs. The sense amplifier SA may output the amplified digital signals as image data IDAT. For example, the image data IDAT may include information about a color of an object and information about a phase of the object. In addition, for convenience, the ADC block 140 and the buffer 160 may be collectively referred to as a "correlated double sampling circuit". In some embodiments of the present disclosure, the image sensor 100 may not include the buffer 160. In this case, a digital signal output from the counter CNT may be output as the image data IDAT.

Figure 3:
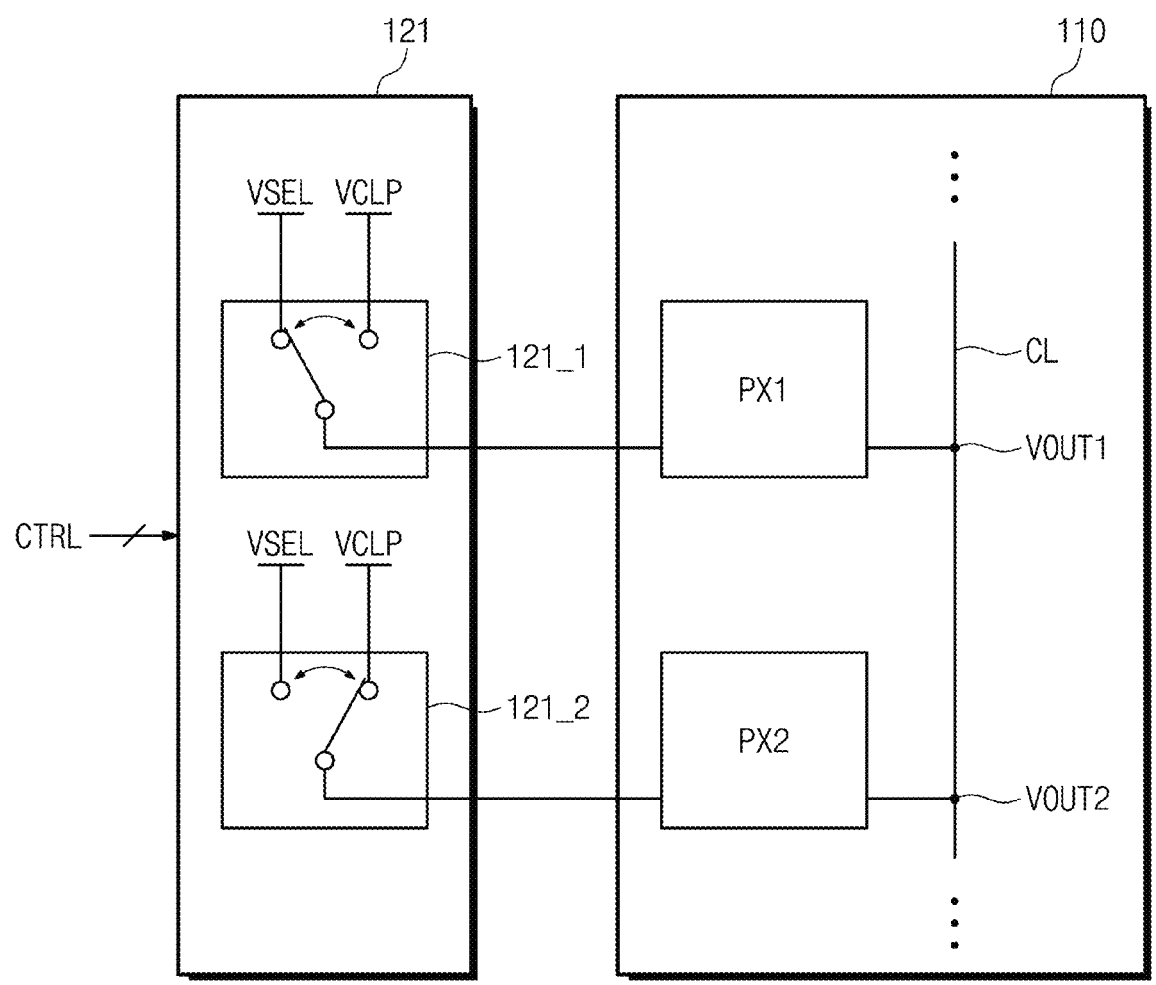
FIG. 3 is as circuit diagram for describing a configuration of a selection controller and a pixel array of FIG. 2.

FIG. 3 is a circuit diagram for describing a configuration of the selection controller 121 and the pixel array 110 of FIG. 2. For convenience, a configuration of the selection controller 121 and the pixel array 110 will be described with reference to FIGS. 2 and 3 together.

The selection controller 121 may include a first sub selection controller 121_1 and a second sub selection controller 121_2. For brevity of illustration, FIG. 3 shows only a sub selection controller corresponding to one of pixels connected with each row. Accordingly, the selection controller 121 may further include a plurality of sub selection controllers, in addition to the first stab selection controller 121_1 and the second sub selection controller 121_2. The first sub selection controller 121_1 may provide a first pixel PX1 with a selection voltage VSEL or a clamp voltage VCLP, based on a plurality of control signals CTRL. A configuration and an operation of the second sub selection controller 121_2 is similar to those of the first sub selection controller 121_1, and thus, additional description associated with the second sub selection controller 121_2 will be omitted to avoid redundancy.

The pixel array 110 may include the first pixel PX1 and a second pixel PX2 connected with the same column line CL. The first pixel PX1 may output a first output voltage VOUT1 based on the selection voltage VSEL or the clamp voltage VCLP. For example, when the first pixel PX1 receives the clamp voltage VCLP, the first pixel PX1 may operate in a first mode in which the first pixel PX1 operates as a clamp circuit. When the first pixel PX1 receives the selection voltage VSEL, the first pixel PX1 may operate in a second mode in which the first pixel PX1 outputs a pixel signal corresponding to the intensity of light incident thereon. A configuration and an operation of the second pixel PX2 is similar to those of the first pixel PX1, and thus, additional description associated with the second pixel PX2 will be omitted to avoid redundancy.

Figure 4A:
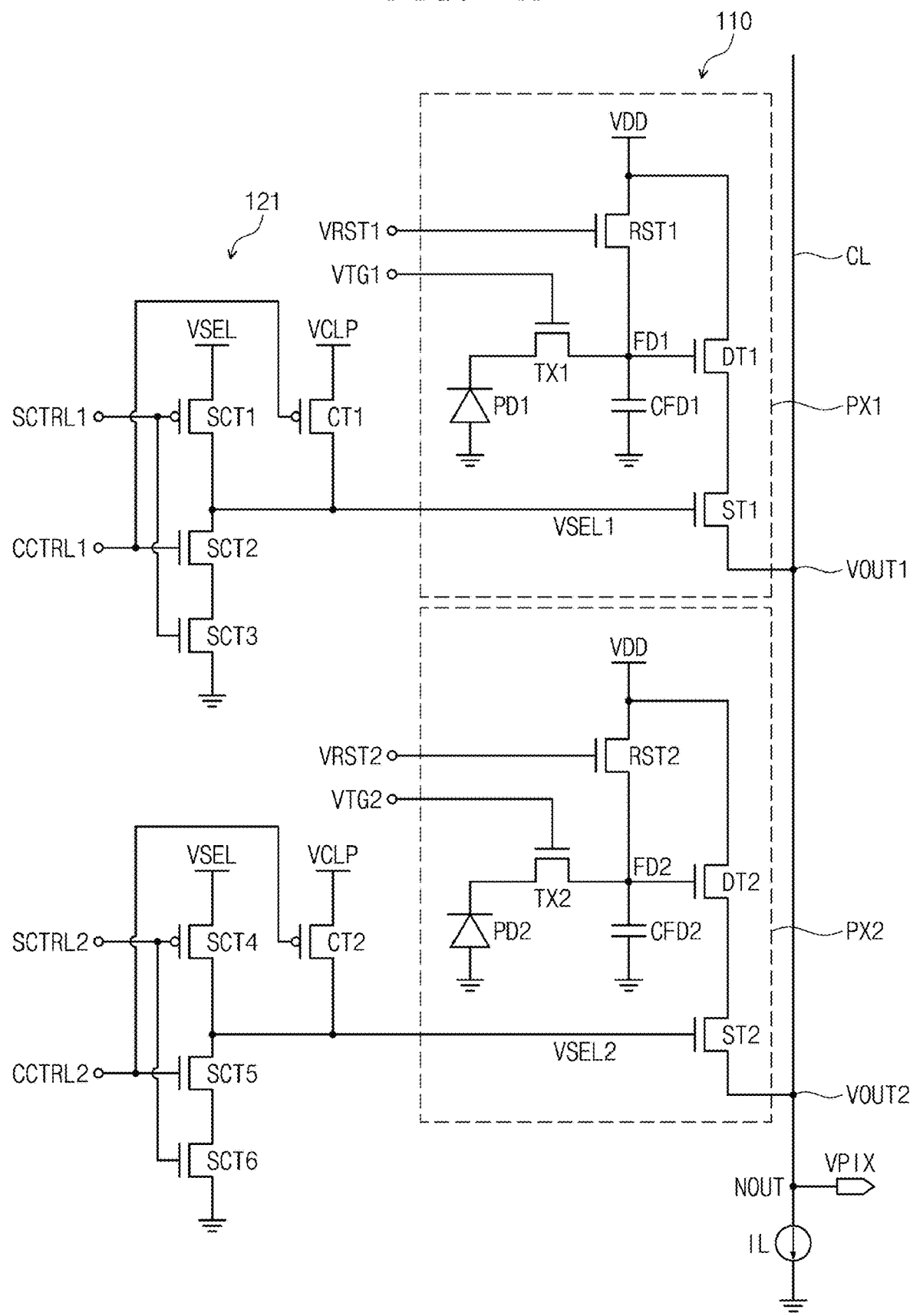
FIGS. 4A and 4B are circuit diagrams for describing configurations and operations of a selection controller and a pixel array according to an embodiment of the present disclosure.
Figure 4B:
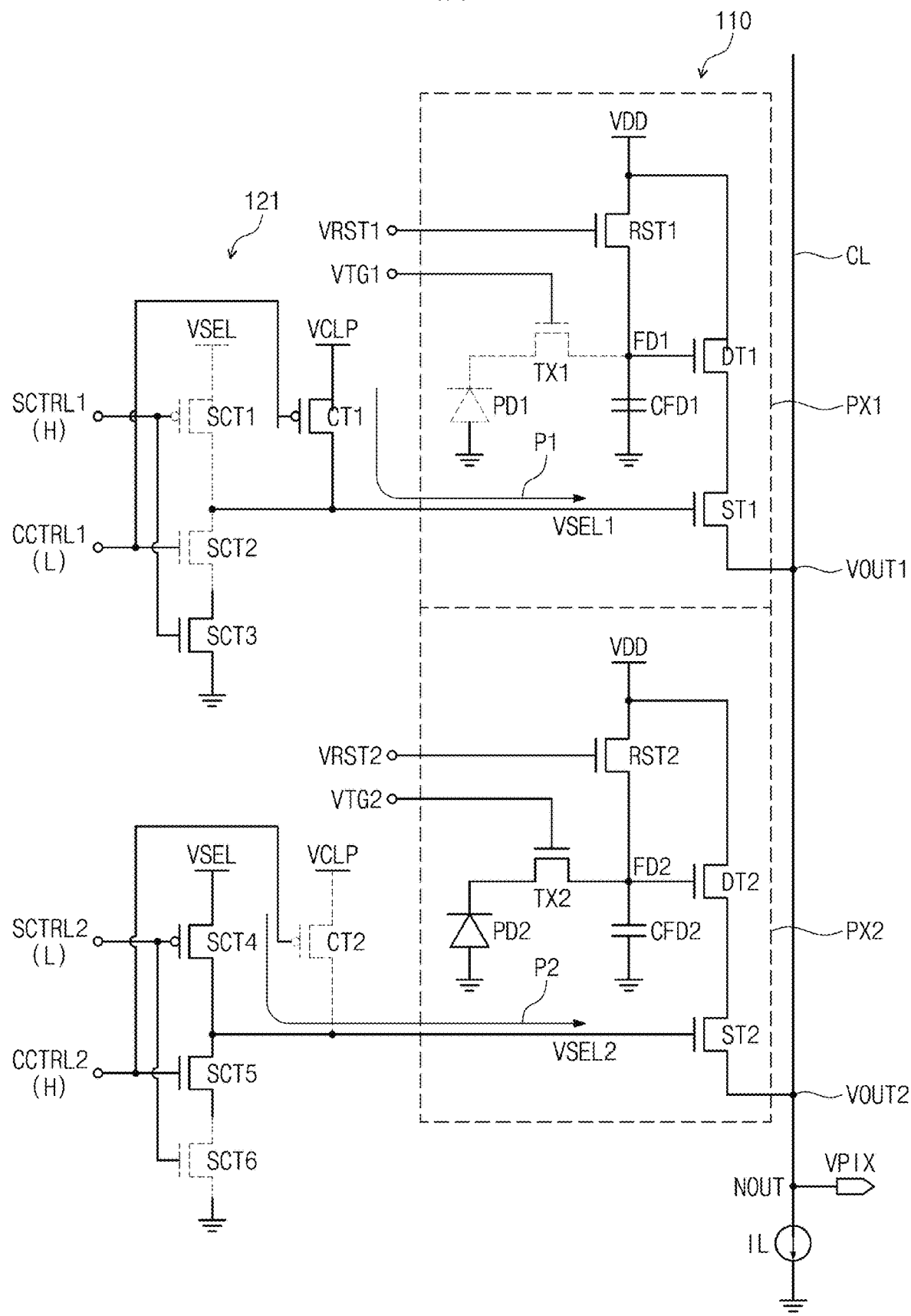

FIGS. 4A and 4B are circuit diagrams for describing configurations and operations of a selection controller and a pixel array according to an embodiment of the present disclosure. The description will be given with reference to FIGS. 2, 4A, and 4B. For brevity of illustration, an example in which one pixel (e.g., PX1) includes one transfer transistor (e.g., TX1) and one photo diode (PD1) is provided; however, the pixel group PG may include a plurality of transfer transistors including first terminals connected with a floating diffusion region (e.g., FD1) and a plurality of photo diodes connected with second terminals of the plurality of transfer transistors. Hereinafter, NOUT may refer to an output node in the drawings.

Referring to FIG. 4A, the pixel array 110 may include the first pixel PX1 and the second pixel PX2 connected with the same column line CL. The first pixel PX1 and the second pixel PX2 may be included in different pixel groups PG. The first pixel PX1 and the second pixel PX2 may be connected with different rows. For example, the first pixel PX1 and the second pixel PX2 may be pixels connected with rows adjacent to each other. However, positions of the first pixel PX1 and the second pixel PX2 are not limited thereto. For example, at least one or more pixels may be further provided between the first pixel PX1 and the second pixel PX2. For brevity of illustration, only one of pixels connected with each row is illustrated, and each of the first pixel PX1 and the second pixel PX2 may be an example of one of pixels connected with each row.

The first pixel PX1 may include a first reset transistor RST1, a first transfer transistor TX1, a first drive transistor DT1, a first select transistor ST1, a first photo diode PD1, and a first floating diffusion region FD1.

The first photo diode PD1 may output charges in response to light. As the intensity of light increases, the amount of charges output by the first photo diode PD1 may increase. The charges output from the first photo diode PD1 may be transferred to the first floating diffusion region FD1 through the first transfer transistor TX1. A level of a voltage of the first floating diffusion region FD1 may decrease due to the charges transferred from the first photo diode PD1, other words, as the intensity of light that the first photo diode PD1 reacts to increases, the level of the voltage of the first floating diffusion region PD1 may decrease. A first terminal of the first photo diode PD1 may be connected with a ground terminal, and a second terminal of the first photo diode PD1 may be connected with the first transfer transistor TX1.

The first transfer transistor TX1 may transfer the charges generated by the first photo diode PD1 to the first floating diffusion region FD1. For example, while the first transfer transistor TX1 is turned on by a first transfer signal VTG1 received from the row driver 120 (refer to FIG. 2), the charges provided from the first photo diode PD1 may be accumulated in the first floating diffusion region FD1. A first terminal of the first transfer transistor TX1 may be connected with the first photo diode PD1, and a second terminal of the first transfer transistor TX1 may be connected with the first floating diffusion region FD1.

The first floating diffusion region FD1 may accumulate the charges provided from the first photo diode PD1. In an embodiment of the present disclosure, a capacitance of the first floating diffusion region FD1 may correspond to a first capacitance CFD1. The first floating diffusion region FD1 may be connected with a gate terminal of the first drive transistor DT1. As a result, a voltage potential corresponding to the charges accumulated in the first floating diffusion region FD1 may be formed.

The first reset transistor RST1 may be turned on by a first reset signal VRST1 and may provide a power supply voltage VDD to the first floating diffusion region FD1. It this case, the charges accumulated in the first floating diffusion region FD1 may move to a terminal for the power supply voltage VDD, and a voltage of the first floating diffusion region FD1 may be reset. A first terminal of the first reset transistor RST1 may be connected with the terminal for the power supply voltage VDD, and a second terminal of the first reset transistor RST1 may be connected with the first floating diffusion region FD1.

The first drive transistor DT1 may amplify the voltage of the first floating diffusion region FD1 and may generate a voltage (e.g., the first output voltage VOUT1) corresponding to a result of the amplification. The first drive transistor DT1 may operate as a source follower amplifier. A first terminal of the first drive transistor DT1 may be connected with the terminal for the power supply voltage VDD, and a second terminal of the first drive transistor DT1 may be connected with a first terminal of the first select transistor ST1.

The first select transistor ST1 may be driven by a first selection signal VSEL1 and may select pixels to be read in units of a row. As the first select transistor ST1 is turned on, the first output voltage VOUT1 may be output through the column line CL.

As in the first pixel PX1, the second pixel PX2 may include a second reset transistor RST2, a second transfer transistor TX2, a second drive transistor DT2, a second select transistor ST2, a second photo diode PD2, a second floating diffusion region FD2, and a second capacitor CFD2. In the second pixel PX2, a gate terminal of the second transfer transistor TX2 may be applied with a second transfer signal VTG2, a gate of the second reset transistor RST2 may be applied with a second reset signal VRST2 and a gate of the second select transistor ST2 may be applied with a second selection signal. VSEL2. A configuration of the second pixel PX2 is similar to that of the first pixel PX1, and thus, additional description associated with the second pixel PX2 will be omitted to avoid redundancy.

The selection controller 121 may include first to sixth selection control transistors SCT1, SCT2, SCT3, SCT4, SCT5, and SCT6, and first and second clamp control transistors CT1 and CT2. The first and fourth selection control transistors SCT1 and SCT4 and the first and second clamp control transistors CT1 and CT2 may be p-channel metal-oxide-semiconductor (PMOS) transistors, and the second, third, fifth and sixth selection control transistors SCT2, SCT3, SCT5, and SCT6 may be n-channel metal-oxide-semiconductor (NMOS) transistors. The selection controller 121 may provide the first selection signal VSEL1 to the first pixel PX1 and may provide the second selection signal VSEL2 to the second pixel PX2. For example, the selection controller 121 may provide the first and second selection signals VSEL1 and VSEL2 to gate terminals of the first and second select transistors ST1 and ST2, respectively. For convenience, the following description will be given with reference to the configuration of the selection controller 121 corresponding to the first pixel PX1. The configuration of the selection controller 121 corresponding to the second pixel PX2 is similar to that corresponding to the first pixel PX1, and thus, additional description will be omitted to avoid redundancy.

The first selection control transistor SCT1 and the third selection control transistor SCT3 may be controlled by a first selection control signal SCTRL1. In other words, the first selection control signal SCTRL1 may be input to the gate terminal of each of the first selection control transistor SCT1 and the third selection control transistor SCL3. The second selection control transistor SCT2 and the first clamp control transistor CT1 may be controlled by a first clamp control signal CCTRL1. In other words, the first clamp control signal CCTRL1 may be input to the gate terminal of each of the second selection control transistor SCT2 and the first clamp control transistor CT1. Here, the first selection control signal SCTRL1 may have a logic high level or a logic low level. Likewise, the first clamp control signal CCTRL1 may have the logic high level or the logic low level.

A first terminal of the first selection control transistor SCT1 may be connected with a terminal for the selection voltage VSEL. When the first selection control transistor SCT1 is wined on by the first selection control signal SCTRL1, the selection voltage VSEL may be provided to the gate terminal of the first select transistor ST1. In this case, the first selection signal VSEL1 may correspond to the selection voltage VSEL. In addition, a first terminal of the first clamp control transistor CT1 may be connected with a terminal for the clamp voltage VCLP. When the first clamp control transistor CT1 is turned on by the first clamp control signal CCTRL1, the clamp voltage VCLP may be provided to the gate terminal of the first select transistor ST1. In this case, the first selection signal VSEL1 may correspond to the clamp voltage VCLP. A detailed operation of the selection controller 121 will be described with reference to FIG. 4B.

The pixel array 110 may provide a pixel signal VPIX to the ADC block 140 (refer to FIG. 2) based on the first output voltage VOUT1 and the second output voltage VOUT2. A current source IL may limit a level of a current that is output from the first pixel PX1 and the second pixel PX2.

According to an embodiment of the present disclosure, referring to FIG. 4B, in the first pixel PX1, the clamp voltage VCLP may be provided to the gate terminal of the first select transistor ST1 as the first selection signal VSEL1; and, in the second pixel PX2, the selection voltage VSEL may be provided to the gate terminal of the second select transistor ST2 as the second selection signal VSEL2. In this case, the first pixel PX1 may operate as a clamp circuit. In the case where the intensity of light incident onto the second photo diode PD2 is excessively strong, a level of a voltage of the second floating diffusion region FD2 may drop excessively. As a result, a level of the second output voltage VOUT2 may be excessively small. To set the lower limit of the level of the second output voltage VOUT2, the first pixel PX1 may output the first output voltage VOUT1 corresponding to the clamp voltage VCLP. Accordingly, the clamp voltage VCLP may correspond to a voltage for setting the tower limit of the level of the second output voltage VOUT2.

In detail, the first pixel PX1 may output the first output voltage VOUT1 in response to the clamp voltage VCLP. The first transfer transistor TX1 may be turned off by the first transfer signal VTG1 corresponding to a disable level. Accordingly, charges may not be transferred from the first photo diode PD1 to the first floating diffusion region FD1. The first select transistor ST1 may receive the clamp voltage VCLP as the tint selection signal VSEL1. The first select transistor ST1 may act as a source follower.

The selection controller 121 may provide the clamp voltage VCLP as the first selection signal VSEL1 to the first select transistor ST1 along a first path P1. The first path P1 may be from the first clamp control transistor CT1 to the first select transistor ST1. In detail the first selection control transistor SCT1 may be turned off by the first selection control signal SCTRL1 having the logic high level "H"; the third selection control transistor SCT3 may be turned on by the first selection control signal SCTRL1 having the logic high level "H"; the first clamp control transistor CT1 may be turned on by the first clamp control signal CCTRL1 having the logic low level "L"; and the second selection control transistor SCT2 may be turned off by the first clamp control signal CCTRL1 having the logic low level "L". As such, the first path P1 through which the clamp voltage VCLP is provided to the first select transistor ST1 may be formed.

The second pixel PX2 may output the second output voltage VOUT2 in response to the selection voltage VSEL. The second transfer transistor TX2 may be turned on by a second transfer signal VTG2 corresponding to an enable level. Accordingly, charges output from the second photo diode PD2 may be accumulated in the second floating diffusion region FD2. The second drive transistor DT2 may provide a voltage corresponding to the accumulated charges of the second floating diffusion region FD2 to the first terminal of the second select transistor ST2. The second select transistor ST2 may be driven by the second selection signal VSEL2 corresponding to the selection voltage VSEL to output the second output voltage VOUT2.

The selection controller 121 may provide the selection voltage VSEL as the second selection signal VSEL2 to the second select transistor ST2 along a second path P2. In detail, the fourth selection control transistor SCT4 may be turned on by the second selection control signal SCTRL2 having the logic low level "L"; the sixth selection control transistor SCT6 may be turned off by the second selection control signal SCTRL2 having the logic low level "L"; the second clamp control transistor CT2 may be turned off by the second clamp control signal CCTRL2 having the logic high level "H"; and the fifth selection control transistor SCT5 may be turned on b the second clamp control signal CCTRL2 having the logic high level "H". As such, the second path P2 through which the selection voltage VSEL is provided to the second select transistor ST2 may be formed. For example, the second path P2 may be from the fourth selection control transistor SCT4 to the second select transistor ST2.

According to an embodiment of the present disclosure, the pixel signal VPIX that is finally provided from the column line CL to the ADC block 140 (refer to FIG. 2) may be based on the first output voltage VOUT1 and the second output voltage VOUT2. For example, the first output voltage VOUT1 and the second output voltage VOUT2 may be simultaneously output as the pixel signal VPIX through the column CL. The pixel signal VPIX may have a voltage being relatively large from among the first output voltage VOUT1 and the second output voltage VOUT2. For example, in the case where the intensity of light incident onto the second photo diode PD2 is weak, a level of the second output voltage VOUT2 may be greater than a level of the first output voltage VOUT1. Accordingly, the pixel signal VPIX may have the level of the second output voltage VOUT2. In contrast, in the case where the intensity of light incident onto the second photo diode PD2 is strong, a level of the second output voltage VOUT2 may be smaller than a level of the first output voltage VOUT1. Accordingly, the pixel signal VPIX may have the level of the first output voltage VOUT1. In other words, the pixel signal VPIX may have a voltage that is obtained as the second output voltage VOUT2 is clamped by the first output voltage VOUT1.

Figure 5:
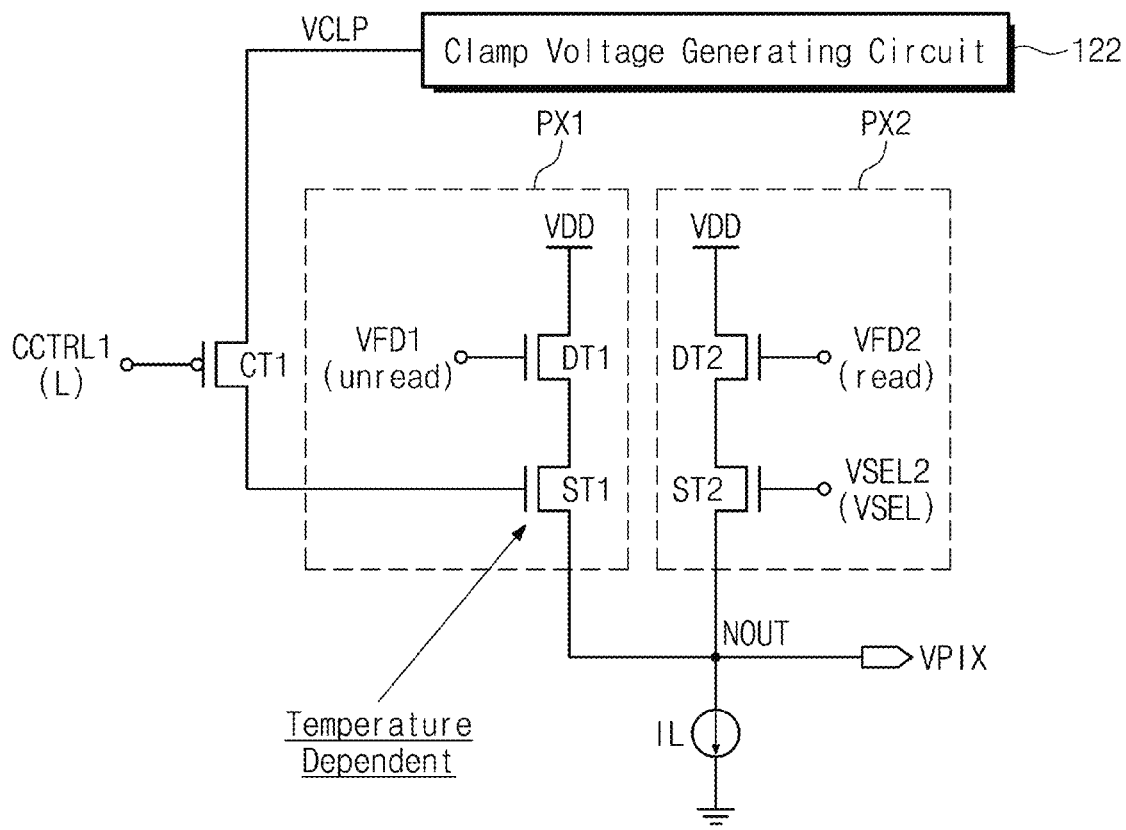
FIG. 5 is a circuit diagram illustrating a select transistor dependent on a temperature in an operation of a pixel array according to an embodiment of the present disclosure.

FIG. 5 is a circuit diagram illustrating a select transistor in an operation of a pixel array according to an embodiment of the present disclosure. The description given with reference to FIGS. 4A and 4B will be omitted.

Referring to FIGS. 4B and 5, the second pixel PX2 may output the second output voltage VOUT2 corresponding to the intensity of incident light. As the first pixel PX1 operates as a clamp circuit, the second output voltage VOUT2 may be clamped by the first output voltage VOUT1. The first select transistor ST1 may be supplied with the clamp voltage VCLP from the clamp voltage generating circuit 122. Here, the clamp voltage VCLP may not be dependent on or sensitive to a temperature change. However, a threshold voltage of the first select transistor ST1 may be dependent on a temperature and may follow the relationship of Equation 1 below.

$$V_{TH} = V_{TH0} + \gamma\left(\sqrt{|V_{SB} + 2\Phi_F|} - \sqrt{|2\Phi_F|}\right) \quad \text{[Equation 1]}$$

Referring to Equation 1, $V_{TH}$ represents a threshold voltage of a transistor, and $V_{TH0}$ represents an initial threshold voltage of a transistor. $\gamma$ represents a body effect parameter, and $V_{SB}$ represents a voltage level difference between a source terminal and a body terminal of a transistor. $2\Phi_F$ represents a surface potential. Because $2\Phi_F$ is a temperature-dependent parameter, $V_{TH}$ is also dependent on a temperature, $2\Phi_F$ may follow the relationship of Equation 2 below.

$$2\Phi_F = \frac{2kT}{q}\ln\frac{N_A}{n_i} \quad \text{[Equation 2]}$$

Referring to Equation 2, "q" represents a charge amount, and "k" represents a coulomb constant. $N_A$ Represents the Avogadro's number, and $n_i$ represents an intrinsic carrier concentration. "T" represents an absolute temperature. Accordingly, $2\Phi_F$ is proportional to the absolute temperature "T".

$$\frac{dV_{TH}}{dT} \approx -x \quad \text{[Equation 3]}$$

Referring to Equation 3, Equation 3 refers to an equation in which $V_{TH}$ is differentiated with respect to "T", by using Equation 1 and Equation 2. "x" represents any positive value. Accordingly, $V_{TH}$ and "T" have a negative correlation. In other words, as a temperature increases, a level of a threshold voltage of a transistor decreases. In contrast, as a temperature decreases, a level of a threshold voltage of a transistor increases.

When a level of a threshold voltage of the first select transistor ST1 changes depending on a temperature change, a voltage level of the pixel signal VPIX may change, and the amount of current flowing through the current source IL may change. Accordingly, a voltage level or a current level that is provided to the ADC block 140 (refer to FIG. 2) may be variable depending on a temperature.

Figure 6:
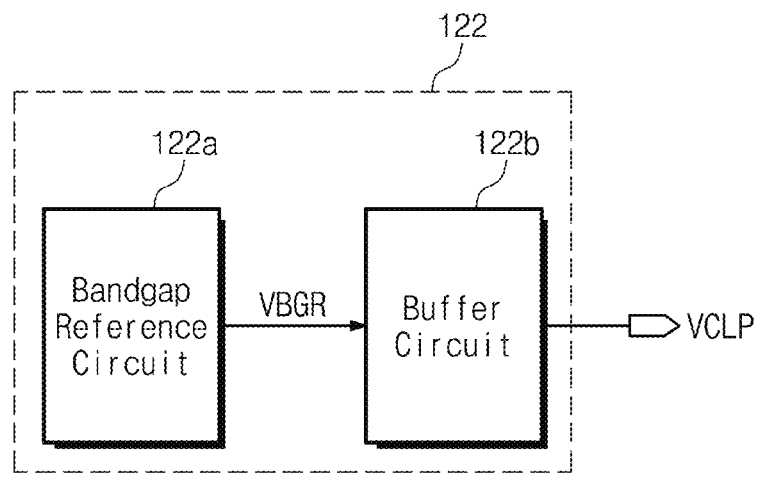
FIG. 6 is a configuration diagram illustrating a clamp voltage generating circuit of FIG. 2.

FIG. 6 is a configuration diagram illustrating the clamp voltage generating circuit 122 of FIG. 2. Referring to FIGS. 5 and 6, the clamp voltage generating circuit 122 may include a bandgap reference circuit 122a and a buffer circuit 122b. The clamp voltage generating circuit 122 may generate the clamp voltage VCLP. The first terminal of the clamp control transistor CT1 may be connected with a terminal for the clamp voltage VCLP, and the clamp voltage generating circuit 122 may provide the clamp voltage VCLP to the terminal for the clamp voltage VCLP.

The bandgap reference circuit 122a may generate a bandgap reference voltage (hereinafter referred to as a "BGR voltage") VBGR. Here, the BGR voltage VBGR may be a voltage insensitive to an absolute temperature. A configuration of the bandgap reference circuit 122a and an operation of generating the BGR voltage VBGR will be described in detail with reference to FIG. 7. The buffer circuit 122b may operate as a voltage buffer (e.g., a source follower) and may output the clamp voltage VCLP corresponding to the BGR voltage VBGR. However, that shown in FIG. 6, the buffer circuit 122b may be provided in the bandgap reference circuit 122a.

Figure 7:
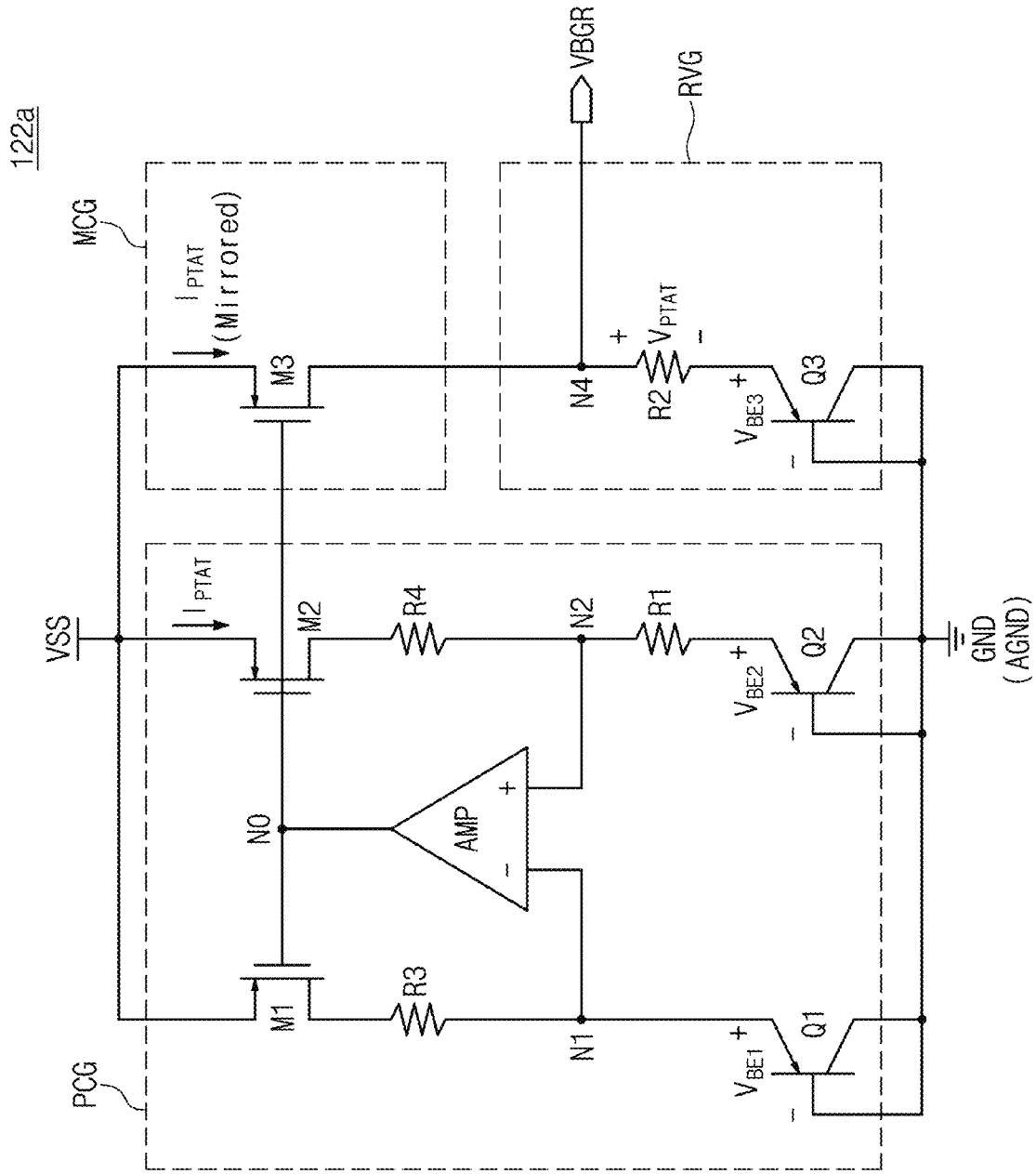
FIG. 7 is a configuration diagram illustrating a bandgap reference circuit of FIG. 6 in more detail.

FIG. 7 is a configuration diagram illustrating the bandgap reference circuit 122a of FIG. 6 in more detail. The bandgap reference circuit 122a may include a proportional to absolute temperature (PTAT) current generator PCG, a mirrored current generator MCG, and a reference voltage generator RVG.

The PTAT current generator PCG may include a first resistor R1, transistors Q1, Q2, M1, and M2, and an amplifier AMP. The PTAT current generator PCG may further include third and fourth resistors R3 and R4. The PTAT currant generator PCG may be supplied with a power supply voltage VSS and a ground voltage GND. In an embodiment of the present disclosure, each of the transistors Q1 and Q2 may be a bipolar junction transistor (BJT). For example, the transistors Q1 and Q2 may be PNP-type BJTs, but the present disclosure is not limited thereto. For example, the transistors Q1 and Q2 may be NPN-type BJTs. In an embodiment of the present disclosure, the transistors M1 and M2 may be PMOS transistors, hut the present disclosure is not limited thereto.

The transistor Q1 may be connected between a first input node N1 and a pound terminal and may operate based on the ground voltage GND. For example, the transistor Q1 may include an emitter node connected with the first input node N1 and a base node and a collector node connected with the ground terminal.

The transistor Q2 may be connected between the first resistor R1 and the ground terminal and may operate based on the ground voltage GND. For example, the transistor Q2 may include an emitter node connected with the first resistor R1 and a base node and a collector node connected with the ground terminal.

The first resistor R1 may be connected between a second input node N2 and the transistor Q2. The amplifier AMP may amplify a voltage difference of the first input node N1 and the second input node N2 to be output through an output node N0. The transistor M1 may be connected between a power node having the power supply voltage VSS and the first input node N1 and may operate in response to a voltage of the output node N0. For example, the voltage of the output node N0 may be applied to the gate terminal of the transistor M1. The transistor M2 may be connected between the power node having the power supply voltage VSS and the second input node N2 and may operate in response to the voltage of the output node N0. For example, the voltage of the output node N0 play be applied to the gate terminal of the transistor M2. In this case, the transistor M2 may generate a PTAT current $I_{PTAT}$ in response to the voltage of the output node N0. The transistor M2 may output the PTAT current $I_{PTAT}$ to the second input node N2.

The third resistor R3 may be connected between the transistor M1 and the first input node N1 and the fourth resistor R4 may be connected between the transistor M2 and the second input node N2.

The mirrored current generator MCG may include a transistor M3. In an embodiment of the present disclosure, the transistor M3 may be a PMOS transistor, but the present disclosure is not limited thereto. The mirrored current generator MCG may be supplied with the power supply voltage VSS and the voltage of the output node N0. The transistor M3 may generate a mirrored PTAT current $I_{PTAT}$ in response to the voltage of the output node N0. The transistor M3 may output the mirrored PTAT current $I_{PTAT}$ to a fourth node N4. The fourth node N4 may be a node at which the BGR voltage VBGR is formed.

The reference voltage generator RVG may include a second resistor R2 and a transistor Q3. The reference voltage generator RVG may be supplied with the mirrored PTAT current $I_{PTAT}$ through the fourth node N4. The reference voltage generator RVG may be supplied with the ground voltage GND. In an embodiment of the present disclosure, the transistor Q3 may be a BJT. For example, the transistor Q3 may be a PNP-type BJT.

The second resistor R2 may be connected with the fourth node N4. The second resistor R2 may be supplied with the mirrored PTAT current $I_{PTAT}$ from the mirrored current generator MCG. The transistor Q3 may be connected between the second resistor R2 and the ground terminal and may operate based on the ground voltage GND. For example, the transistor Q3 may include an emitter node connected with the second resistor R2 and a base node and a collector node connected with the ground terminal.

The reference voltage generator RVG may generate the BGR voltage VBGR insensitive to an absolute temperature based on the mirrored PTAT current $I_{PTAT}$ and a voltage $V_{BE3}$ of the transistor Q3. A characteristic of the BGR voltage VBGR insensitive to an absolute temperature will be described in more detail with reference to Equation 4 below.

$$VBGR = V_{BE} + I_{PTAT} R2 \quad \text{[Equation 4]}$$

Equation 4 above refers to an equation indicating the BGR voltage VBGR. $V_{BE}$ represents a voltage value between the emitter node and the base node of the transistor Q3. $V_{BE}$ may have a value that is inversely proportional to an absolute temperature based on a device characteristic. $I_{PTAT}$ represents the mirrored PTAT current $I_{PTAT}$ output from the mirrored, current generator MCG. R2 represents a resistance value of the second resistor R2.

Because the mirrored PTAT current $I_{PTAT}$ is based on the PTAT current $I_{PTAT}$ generated by the PTAT current generator PCG, assuming that "A" is a gain of the transistor Q1 and n*A is a gain of the transistor Q2, the PTAT current $I_{PTAT}$ may be expressed by Equation 5 below.

$$I_{PTAT} = \frac{V_{BE1} - V_{BE2}}{R1} = \frac{V_T \ln\left(\frac{I_C}{I_S}\right) - V_T \ln\left(\frac{I_C}{nI_S}\right)}{R1} = \frac{V_T \ln n}{R1} \quad \text{[Equation 5]}$$

Equation 5 above refers to an equation indicating the PTAT current $I_{PTAT}$. $V_{BE1}$ represents a voltage value between the emitter node and the base node of the transistor Q1. $V_{BE2}$ represents a voltage value between the emitter node and the base node of the transistor Q2. R1 is a resistance value of the first resistor R1. $I_C$ represents a current flowing through the collector node of the transistor Q1. $I_S$ represents a saturation current of the transistor Q1. "n" represents a ratio of a gain of the transistor Q2 to a gain of the transistor Q1. $V_T$ represents a thermal voltage. Because a thermal voltage is proportional to an absolute temperature, the PTAT current $I_{PTAT}$ may have a magnitude proportional to the absolute temperature.

$$VBGR = V_{BE} + \frac{R2}{R1} V_T \ln n \quad \text{[Equation 6]}$$

Equation 6 refers to an equation obtained by rearranging Equation 4 based on Equation 5. Referring to Equation 6, because $$\frac{R2}{R1} V_T \ln n$$

has a value proportional to an absolute temperature and $V_{BE}$ has a value decreasing as the absolute temperature increases, the fluctuations of the absolute temperature may be canceled out. In other words, in Equation 6 above, $$\frac{R2}{R1} V_T \ln n$$

is a PTAT term, and $V_{BE}$ is a CTAT (complementary to absolute temperature) term. For example, in the case where an absolute temperature increases, because $$\frac{R2}{R1} V_T \ln n$$

increases and $V_{BE}$ decreases, the influence of the increase in the absolute temperature on the BGR voltage VBGR may be canceled out. In contrast, in the case where an absolute temperature decreases, because $$\frac{R2}{R1} V_T \ln n$$

decreases and $V_{BE}$ increases, the influence of the decrease in the absolute temperature on the BGR voltage VBGR may be canceled out. In other words, the BGR voltage VBGR may have a value insensitive to a change in an absolute temperature.

Figure 8:
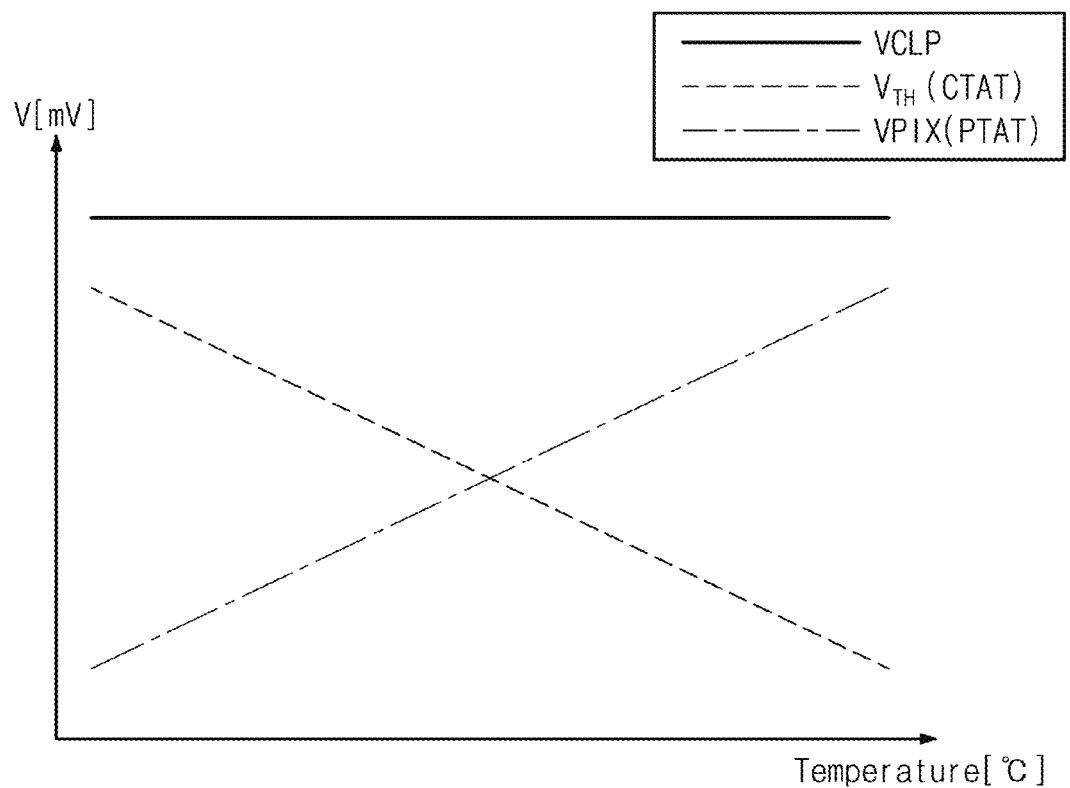
FIG. 8 is a graph illustrating a change of a pixel voltage dependent on a temperature.

FIG. 8 is a graph illustrating a change of a pixel voltage dependent on a temperature. Referring to FIGS. 5 and 8, the first select transistor ST1 may operate as a source follower. The first select transistor ST1 may output the pixel signal VPIX based on the clamp voltage VCLP and a threshold voltage $V_{TH}$. Here, a voltage level of the pixel signal VPIX may correspond to a voltage level that is obtained by subtracting a level of the threshold voltage $V_{TH}$ from a level of the clamp voltage VCLP.

The clamp voltage VCLP that is based on the BGR voltage VBGR insensitive to a temperature change may be input to the first select transistor ST1. Accordingly, the level of the clamp voltage VCLP may be uniform regardless of an increase or decrease in a temperature. However, the threshold voltage $V_{TH}$ of the first select transistor ST1 may have the CTAT characteristic like Equation 3. Accordingly, as a temperature increases, the level of the threshold voltage $V_{TH}$ may decrease. The pixel signal VPIX may have the PTAT characteristic due to the CTAT characteristic of the threshold voltage $V_{TH}$. In other words, as a temperature increases, the voltage level of the pixel signal VPIX may increases. As a result, the voltage level of the pixel signal VPIX that is provided to the ADC block 140 (refer to FIG. 2) may be dependent on a temperature. Accordingly, in a situation where a temperature change is great, the voltage level of the pixel signal VPIX may exceed an allowable voltage range of the ADC block 140.

Figure 9:
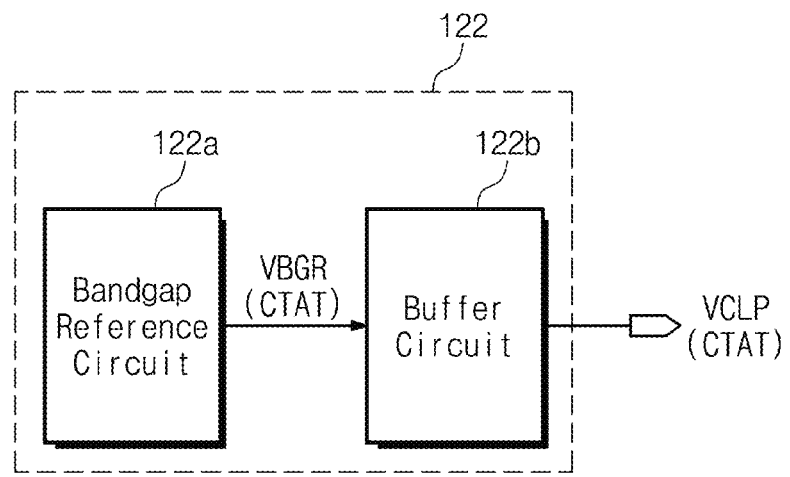
FIG. 9 is a configuration diagram illustrating as clamp voltage generating circuit according to another embodiment of the present disclosure.

FIG. 9 is a configuration diagram illustrating the clamp voltage generating circuit 122 according to an embodiment of the present disclosure. The bandgap reference circuit 122a according to an embodiment of the present disclosure may output the BGR voltage VBGR having the CTAT characteristic. The buffer circuit 122b may output the clamp voltage VCLP having the CTAT characteristic, based on the BGR voltage VBGR having the CTAT characteristic.

Referring to FIGS. 7 and 9, it may be understood that the BGR voltage VBGR is determined depending on the degree of mutual compensation of the PTAT term and the CTAT term (refer to Equation 6). Accordingly, by adjusting, in $$\frac{R2}{R1} V_T \ln n$$

being the PTAT term, a value of $$\frac{R2}{R1},$$

the BGR voltage VBGR, may indicate the PTAT or CTAT characteristic. For example, when $$\frac{R2}{R1}$$

increases, the BGR voltage VBGR may have the PTAT characteristic; when $$\frac{R2}{R1}$$

decreases, the BGR voltage VBGR, may have the CTAT characteristic. Accordingly, according to an embodiment of the present disclosure, a value of $$\frac{R2}{R1}$$

of the bandgap reference circuit 122a may decrease by adjusting a value of the first resistor R1 and a value of the second resistor R2 depending on a request of a user or settings of a manufacturer. As a result, the bandgap reference circuit 122a may output the clamp voltage VCLP having the CTAT characteristic.

Figure 10:
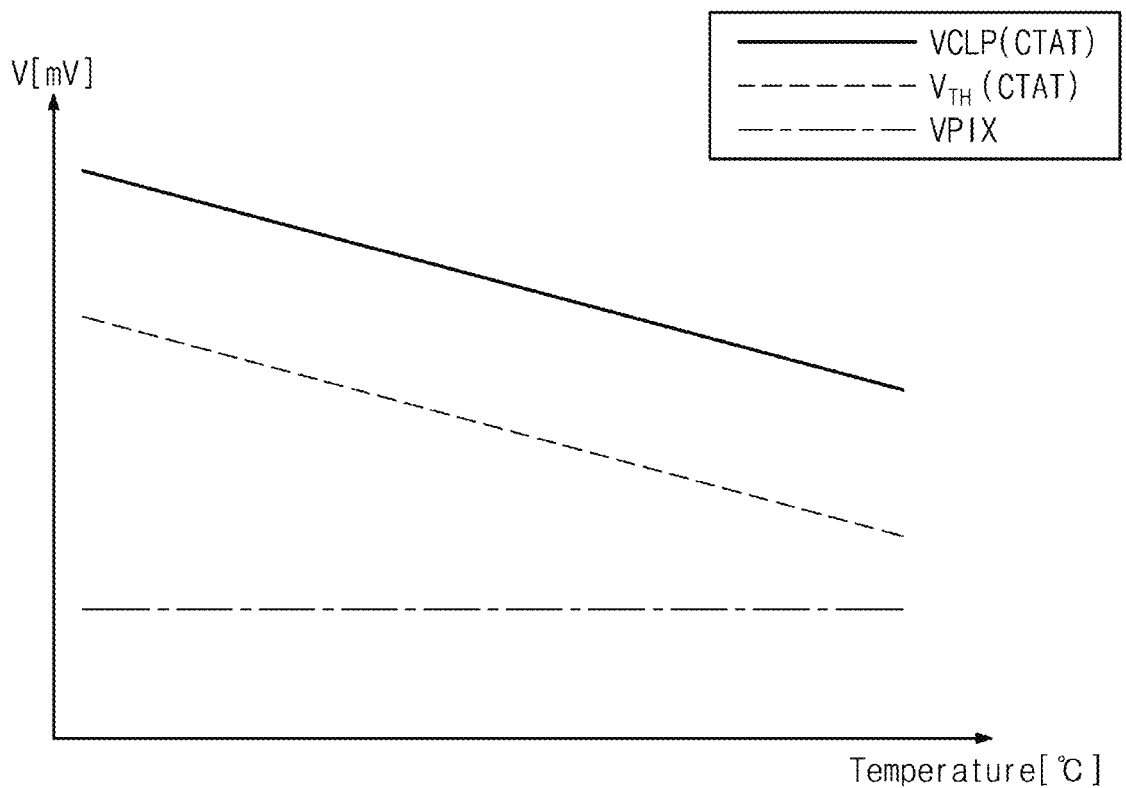
FIG. 10 is a graph illustrating a change in a pixel voltage according to a temperature in a clamp voltage generating circuit of FIG. 9.

FIG. 10 is a graph illustrating a change in a pixel voltage according to a temperature in an embodiment of the clamp voltage generating circuit 122 of FIG. 9. The description given with reference to FIG. 8 will be omitted to avoid redundancy.

Referring to FIGS. 5, 9, and 10, the clamp voltage VCLP that is based on the BGR voltage VBGR having the CTAT characteristic may be input to the first select transistor ST1. Accordingly, as a temperature increases, a level of the clamp voltage VCLP may decrease. In addition, the threshold voltage $V_{TH}$ of the first select transistor ST1 may have the CTAT characteristic like Equation 3. Accordingly, as a temperature increases, a level of the threshold voltage $V_{TH}$ may decrease. Because both the clamp voltage VCLP and the threshold voltage $V_{TH}$ have the CTAT characteristic, the pixel signal VPIX may be insensitive to a temperature change or may maintain a uniform voltage level regardless of a temperature change. As a temperature changes, a voltage that the first select transistor ST1 outputs may change due to the threshold voltage $V_{TH}$ of the first select transistor ST1. However, according to an embodiment of the present disclosure, the change in the output voltage according to the temperature change may be compensated for by using the clamp voltage VCLP having the CTAT characteristic. As a result, the voltage level of the pixel signal VPIX that is provided to the ADC block 140 (refer to FIG. 2) may be insensitive to a temperature. Accordingly, even in a situation where a temperature change is great, the voltage level of the pixel signal VPIX may not exceed the allowable voltage range of the ADC block 140.

Figure 11:
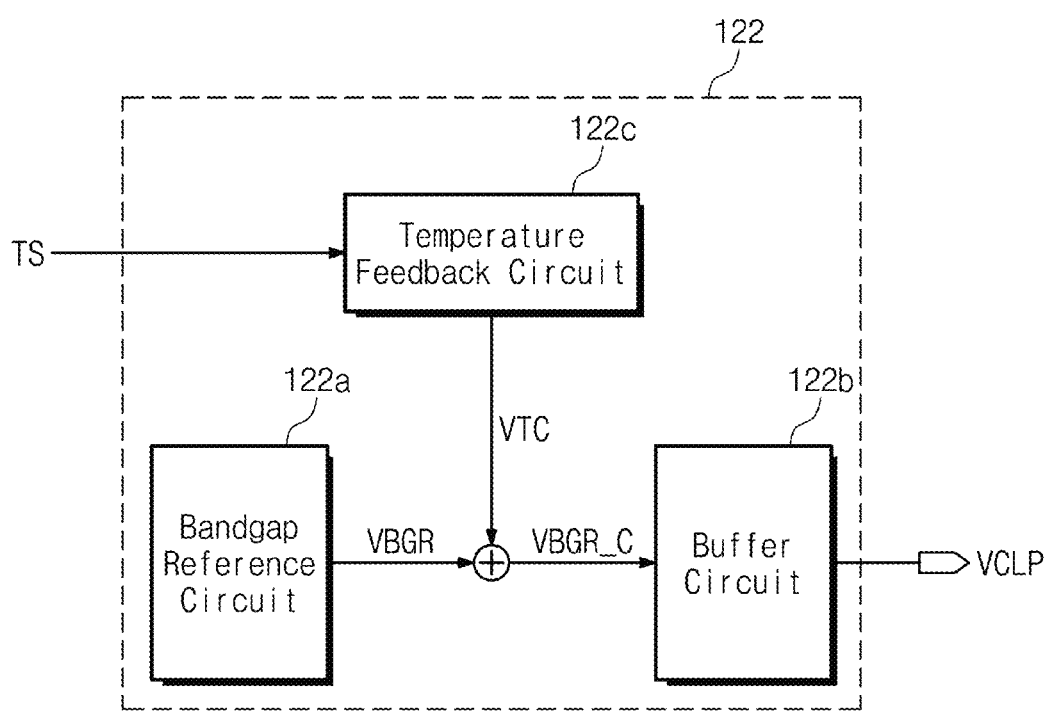
FIG. 11 is a configuration diagram illustrating a clamp voltage generating circuit according to another embodiment of the present disclosure.

FIG. 11 is a configuration diagram illustrating the clamp voltage generating circuit 122 according to another embodiment of the present disclosure. The description given with reference to FIG. 6 will be omitted to avoid redundancy. According to an embodiment of the present disclosure, the clamp voltage generating circuit 122 may further include a temperature feedback circuit 122c in addition to the components of the clamp voltage generating circuit 122 of FIG. 6.

The temperature feedback circuit 122c may output a temperature compensation voltage VTC based on a temperature signal TS. An example in which the temperature feedback circuit 122c receives the temperature signal TS from the outside is illustrated, but the present disclosure is not limited thereto. For example, the temperature signal TS may include information about a temperature change. In addition, the temperature feedback circuit 122c may be coupled with temperature sensors that provide the temperature signal TS. The temperature feedback circuit 122c may adjust and output a level of the temperature compensation voltage VTC based on a temperature change. For example, when a temperature increases, the temperature feedback circuit 122c may output the temperature compensation voltage VTC having a voltage level corresponding to the increased temperature. In contrast, when a temperature decreases, the temperature feedback circuit 122c may output the temperature compensation voltage VTC having a voltage level corresponding to the decreased temperature.

The bandgap reference circuit 122a may output the BGR volume VBGR insensitive to a temperature. The buffer circuit 122b may output the clamp voltage VCLP having the CTAT characteristic, based on a compensated. BGR voltage VBGR_C. The compensated BGR voltage VBGR_C, may be based on the BGR voltage VBGR and the temperature compensation voltage VTC. The temperature compensation voltage VTC may be used to generate the compensated BGR voltage VBGR_C by compensating for the BGR voltage VBGR based on a temperature change. For example, when a temperature increases, the compensated BGR voltage VBGR_C may be smaller than the BGR voltage VBGR. In contrast, when a temperature decreases, the compensated BGR voltage VBGR_C may be greater than the BGR voltage VBGR. As a temperature changes, a voltage that the first select transistor ST1 outputs may change due to the threshold voltage $V_{TH}$ of the first select transistor ST1. However, according to an embodiment of the present disclosure, the change in the output voltage according to the temperature change may be compensated for by using the clamp voltage VCLP having the CTAT characteristic.

Figure 12:
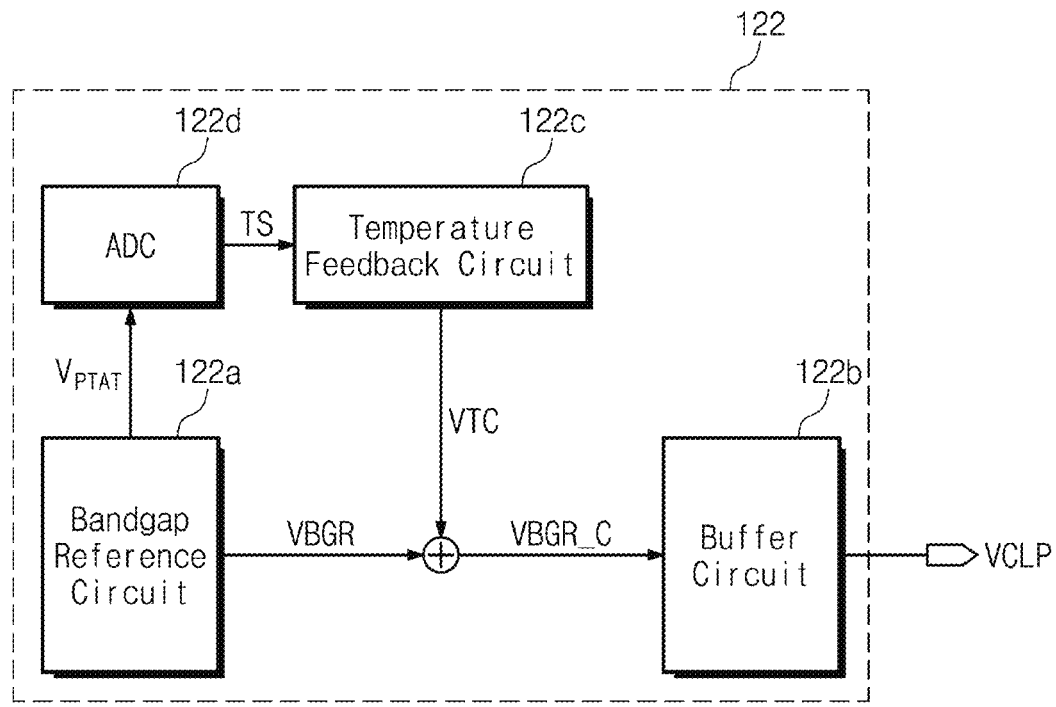
FIG. 12 is a configuration diagram illustrating a clamp voltage generating circuit according to another embodiment of the present disclosure.

FIG. 12 is a configuration diagram illustrating the clamp voltage generating circuit 122 according to another embodiment of the present disclosure. According to an embodiment of the present disclosure, the clamp voltage generating circuit 122 may further include an analog-to-digital converter (ADC) 122d in addition to the components of the clamp voltage generating circuit 122 of FIG. 11. The description given with reference to FIGS. 6 and 11 will be omitted to avoid redundancy.

Referring to FIGS. 7 and 12, the ADC 122d may generate the temperature signal TS based on a PTAT voltage $V_{PTAT}$. For example, the PTAT voltage $V_{PTAT}$ may be provided to the ADC 122d from the bandgap reference circuit 122a. Referring to Equation 4 and Equation 6, the PTAT voltage $V_{PTAT}$ is $I_{PTAT}R2$, and $I_{PTAT}R2$ has the PTAT characteristic proportional to an absolute temperature. The bandgap reference circuit 122a may transfer a voltage (e.g., the PTAT voltage $V_{PTAT}$) across the second resistor R2 between the fourth node N4 and the transistor Q3 to the ADC 122d. The ADC 122d may compare the PTAT voltage $V_{PTAT}$ and a reference voltage to generate the temperature signal TS indicating how much a temperature changes. For example, the temperature signal TS may be in the form of digital code.

Figure 13:
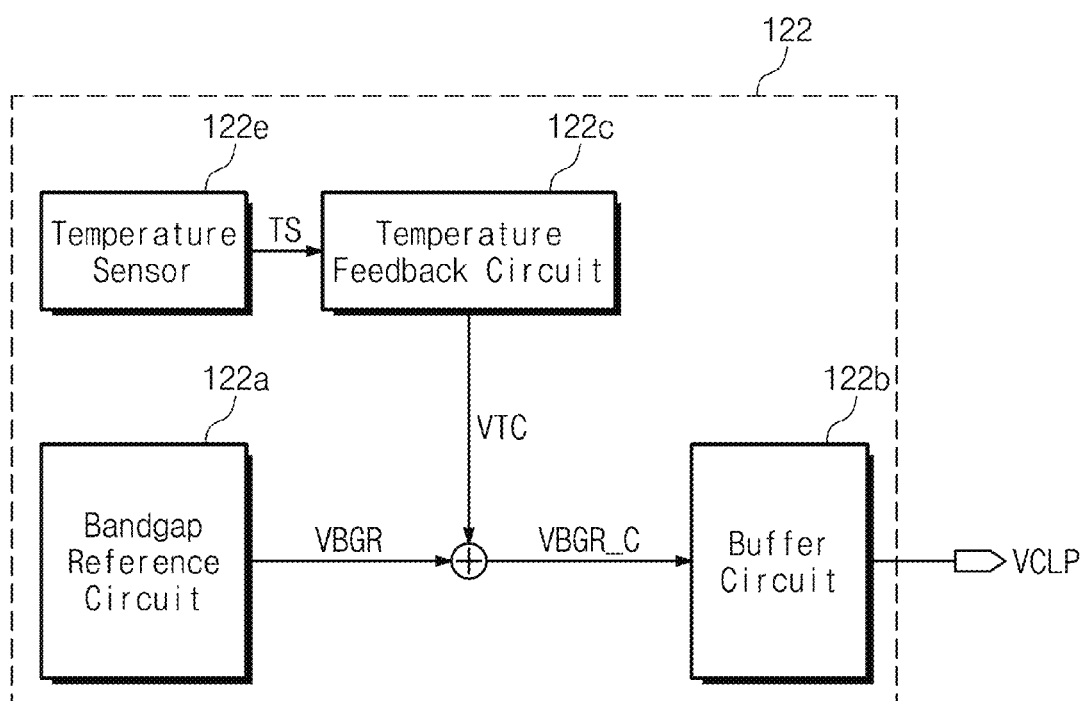
FIG. 13 is a configuration diagram illustrating a clamp voltage generating circuit according to another embodiment of the present disclosure.

FIG. 13 is a configuration diagram illustrating the clamp voltage generating circuit 122 according to another embodiment of the present disclosure. The description given with reference to FIGS. 6 and 11 will be omitted to avoid redundancy. According to an embodiment of the present disclosure, the clamp voltage generating circuit 122 may further include a temperature sensor 122e in addition to the components of the clamp voltage generating circuit 122 of FIG. 11.

The temperature sensor 122e may sense a temperature of the image sensor 100 (refer to FIG. 1). The temperature sensor 122e may generate the temperature signal TS based on the sensed temperature. For example, the temperature sensor 122e may be one of a contact temperature sensor and a non-contact temperature sensor. For example, the temperature sensor 122e may be a contact temperature sensor including a thermocouple, a resistance thermometer, a thermistor, an integrated circuit temperature sensor, or a magnetic temperature sensor. For example, the temperature sensor 122e may be a non-contact temperature sensor including a thermopile or a pyroelectric temperature sensor. However, the temperature sensor 122e is not limited to the above example, and may include any temperature sensor capable of sensing a temperature. In addition, an example in which the clamp voltage generating circuit 122 includes the temperature sensor 122e is illustrated, but the present disclosure is not limited thereto. For example, the temperature sensor 122e may be provided outside the clamp voltage generating circuit 122.

Figure 14:
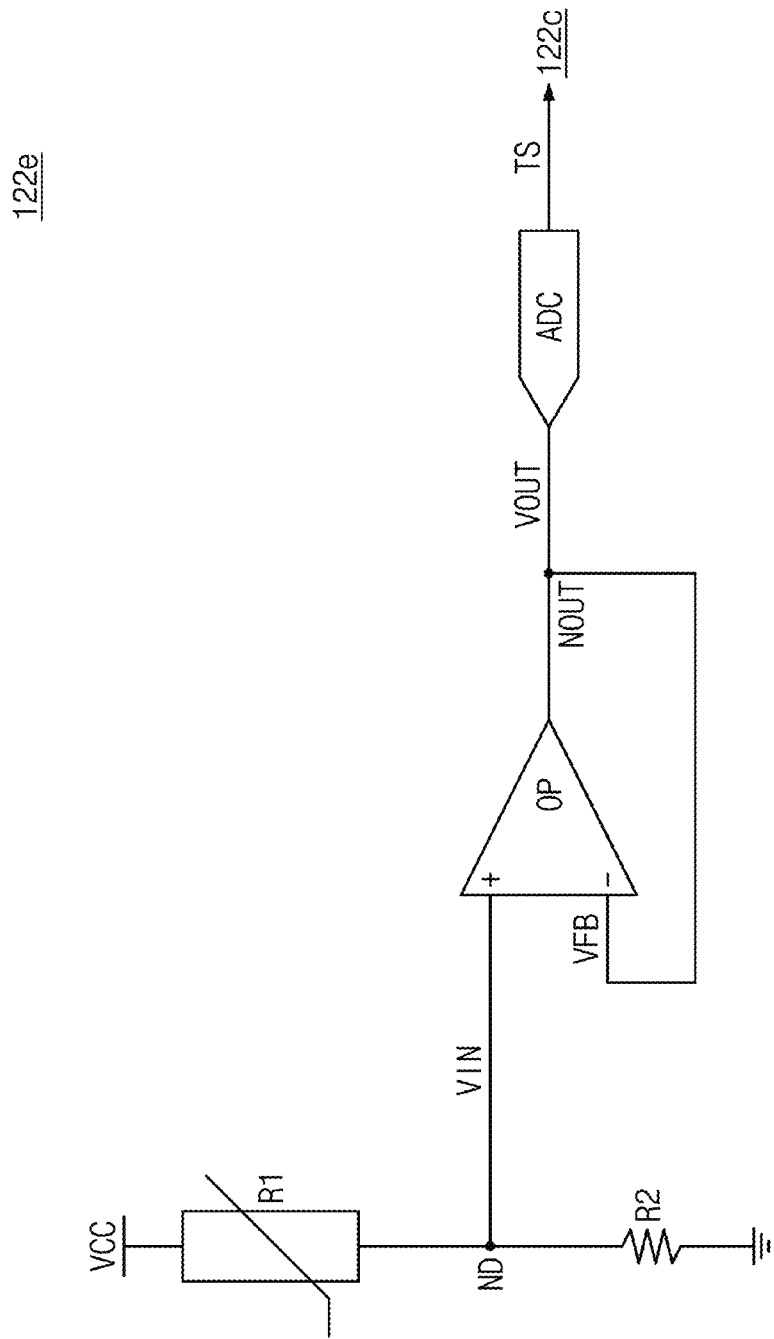
FIG. 14 is a circuit diagram illustrating a temperature sensor according to an embodiment of the present disclosure.

FIG. 14 is a circuit diagram illustrating a temperature sensor according to an embodiment of the present disclosure. Referring to FIGS. 13 and 14, the temperature sensor 122e may be implemented with a circuit including a thermistor.

According to an embodiment of the present disclosure, the temperature sensor 122e may include a thermistor R1, a resistor R2, an amplifier OP, and an analog-to-digital converter ADC. A first terminal of the thermistor R1 may be connected with the terminal for the power supply voltage VCC, and a second terminal of the thermistor R1 may be connected with a voltage division node ND. The thermistor R1 may be a variable resistance element whose resistance value varies depending on a temperature change. The thermistor R1 is provided by way of example, but the present disclosure is not limited thereto. For example, the thermistor R1 may be replaced with a separate temperature sensor for sensing a temperature, or with any other passive or active element in which an output parameter (e.g., a resistance, a capacitance, an inductance, a current, or a voltage) varies depending on a temperature change.

For example, a resistance value of the thermistor R1 exponentially changes depending on a temperature. In other words, because a resistance value of the thermistor R1 sharply changes at a high temperature, an input voltage may sharply change at a high temperature, thereby a temperature may not be accurately detected. In this case, an input voltage VIN may linearly change depending on a temperature by connecting the resistor R2 between the voltage division node ND and the ground terminal. In other words, a temperature may be accurately detected by connecting the resistor R2 between the voltage division node ND and the ground terminal, in an embodiment of the present disclosure, as the thermistor R1 and the resistor R2 are connected in series, an input voltage may have linearity and uniformity regardless of a temperature change and process, voltage, and temperature (PVT) variations. Accordingly, the power supply voltage VCC may be divided depending on resistance values of the thermistor R1 and the resistor R2, and a voltage level of the voltage division node ND may correspond to a level of the input voltage VIN.

The amplifier OP may output the output voltage VOUT based on the input voltage VIN. For example, the amplifier OP may receive the input voltage VIN through a (+) terminal and may receive a feedback voltage VFB through a (−) terminal. For example, an output terminal of the amplifier OP may be connected with an output node NOUT and may output the output voltage VOUT. Unlike that shown in FIG. 14, a passive element or an active element for adjusting the feedback voltage VFB may be further provided between the output node NOUT and the (−) terminal of the amplifier OP.

The analog-to-digital converter ADC may generate the temperature signal TS based on the output voltage VOUT. For example, the analog-to-digital converter ADC may compare the output voltage VOUT and a reference voltage to generate the temperature signal TS indicating how much a temperature changes. For example, the temperature signal may be in the form of digital code.

Figure 15:
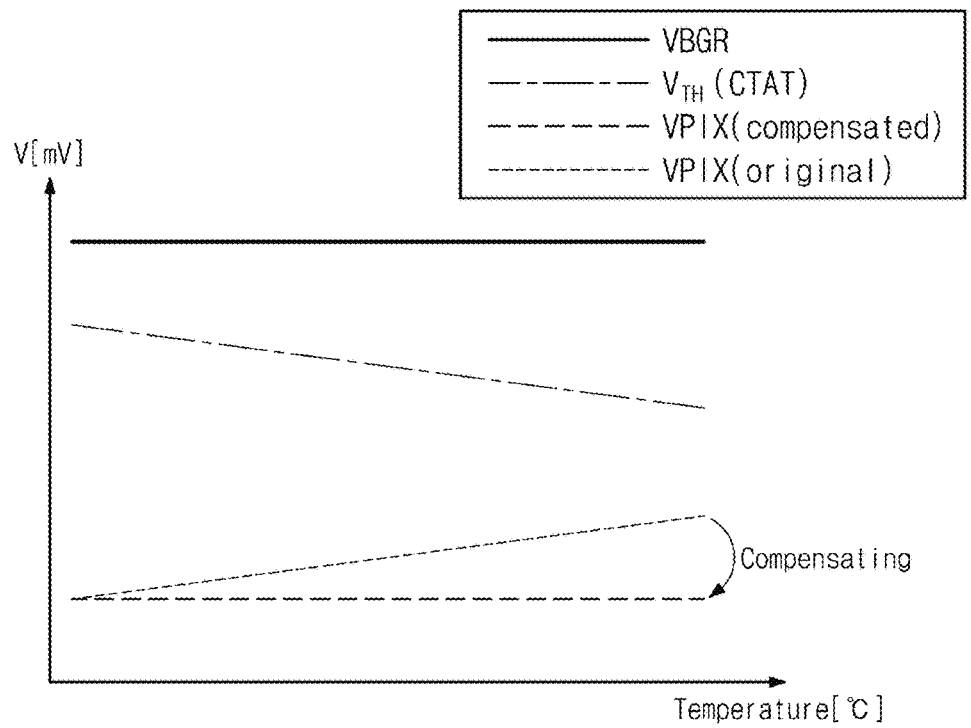
FIG. 15 is a graph illustrating a change in a pixel voltage according to a temperature in embodiments of a clamp voltage generating circuit of FIGS. 11 to 13.

FIG. 15 is a graph illustrating a change in a pixel voltage according to a temperature in embodiments of the clamp voltage generating circuit 122 of FIGS. 11 to 13. The description given with reference to FIGS. 8 and 10 will be omitted to avoid redundancy.

Referring to FIGS. 5, 11 to 13, and 15, the bandgap reference circuit 122a may output the BGR voltage VBGR insensitive to a temperature. The threshold voltage $V_{TH}$ of the first select transistor ST1 may have the CTAT characteristic like Equation 3. In the case where the clamp voltage generating circuit 122 outputs the clamp voltage VCLP corresponding to the BGR voltage VBGR without modification, the pixel signal VPIX may have the PTAT characteristic due to the threshold voltage $V_{TH}$ of the first select transistor ST1, like the illustrated graph waveform VPIX (original). According to an embodiment of the present disclosure, the clamp voltage generating circuit 122 may further include the temperature feedback circuit 122c. The temperature feedback circuit 122c may output the temperature compensation voltage VTC capable of compensating for a voltage level of the pixel signal VPIX, which varies depending on a temperature change. Accordingly, the compensated pixel signal VPIX (compensated) may be insensitive to a temperature change as illustrated. As a result, the voltage level of the pixel signal VPIX that is provided to the ADC block 140 (refer to FIG. 2) may be insensitive to a temperature. Accordingly, even in a situation where a temperature change is great, the voltage level of the pixel signal VPIX may not exceed the allowable voltage range of the ADC block 140.

Figure 16:
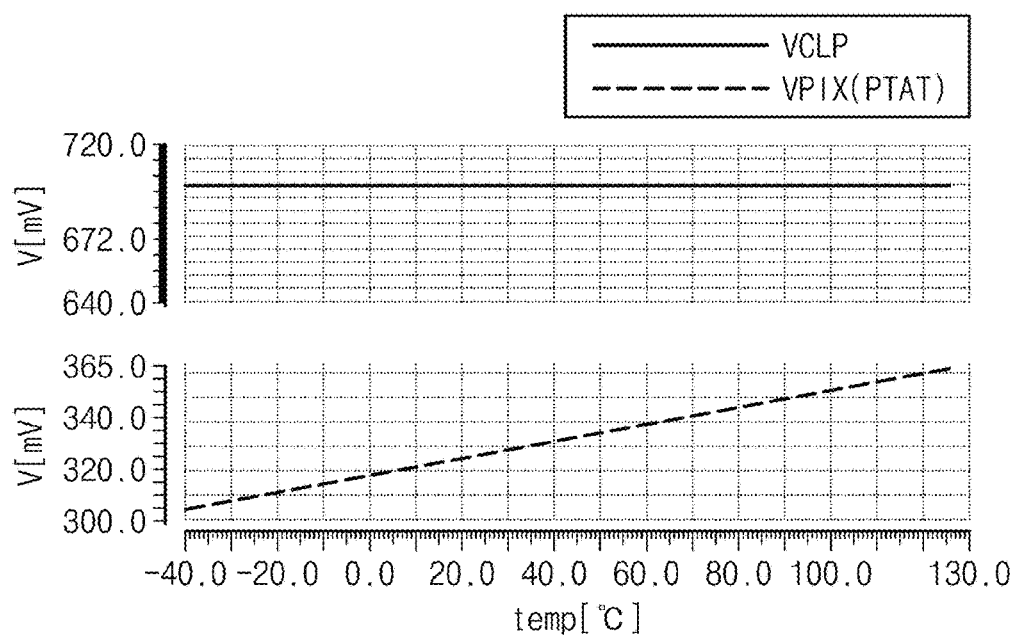
FIG. 16 is a graph illustrating a change of a pixel voltage dependent on a temperature by using detailed numerical values.

FIG. 16 is a graph illustrating a change of a pixel voltage dependent on a temperature by using detailed numerical values. In FIG. 16, an x-axis represents a temperature (° C.), and a y-axis represents a voltage level (mV).

Referring to FIGS. 5, 6, and 16, a situation where the first select transistor ST1 according to an embodiment of the present disclosure receives the clamp voltage VCLP insensitive to a temperature change is assumed. Accordingly, the pixel signal VPIX may have the PTAT characteristic due to the threshold voltage $V_{TH}$ of the first select transistor ST1, which has the CTAT characteristic. Referring to the graph of FIG. 16, a voltage level of the pixel signal VPIX is about 300 mV at −40° C.; a voltage level of the pixel signal VPIX is about 360 mV at 120° C. In other words, the voltage variation of the pixel signal VPIX may correspond to about 60 mV. Accordingly, when the input voltage range of the ADC block 140 (refer to FIG. 2) is 900 mV, the voltage variation of the pixel signal VPIX may cause a difference of 1,000 least significant bit (LSB) or more.

Figure 17A:
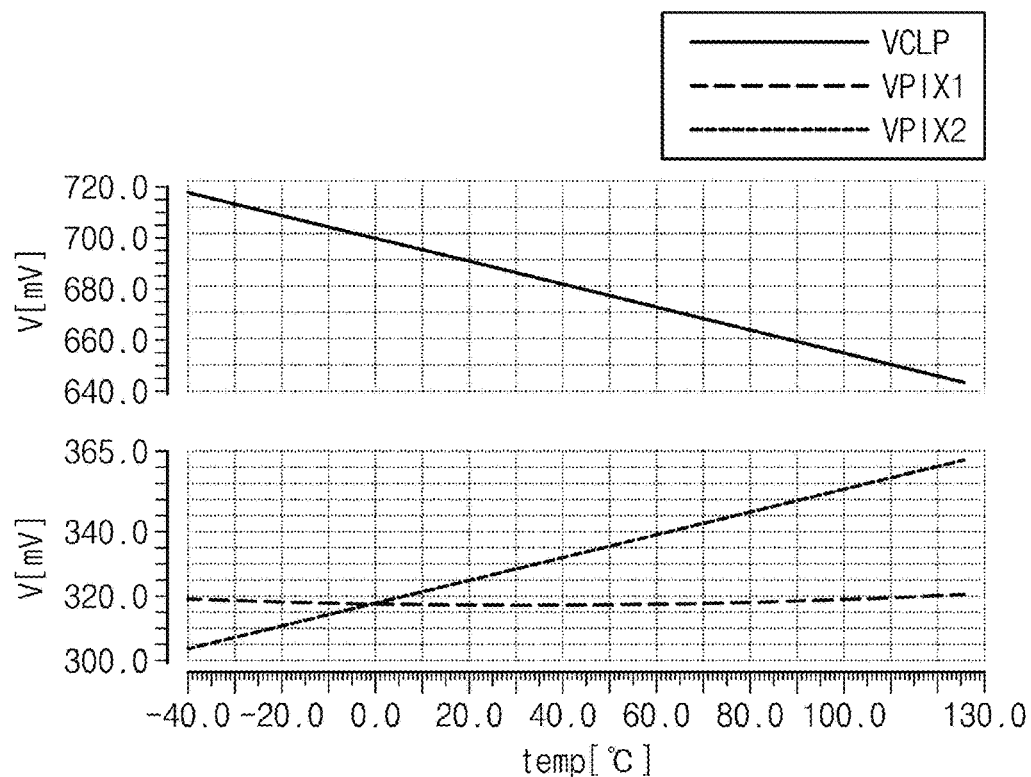
FIGS. 17A and 17B are graphs illustrating a change in a pixel voltage according to a temperature in an embodiment of a clamp voltage generating circuit of FIG. 9 by using detailed numerical values.
Figure 17B:
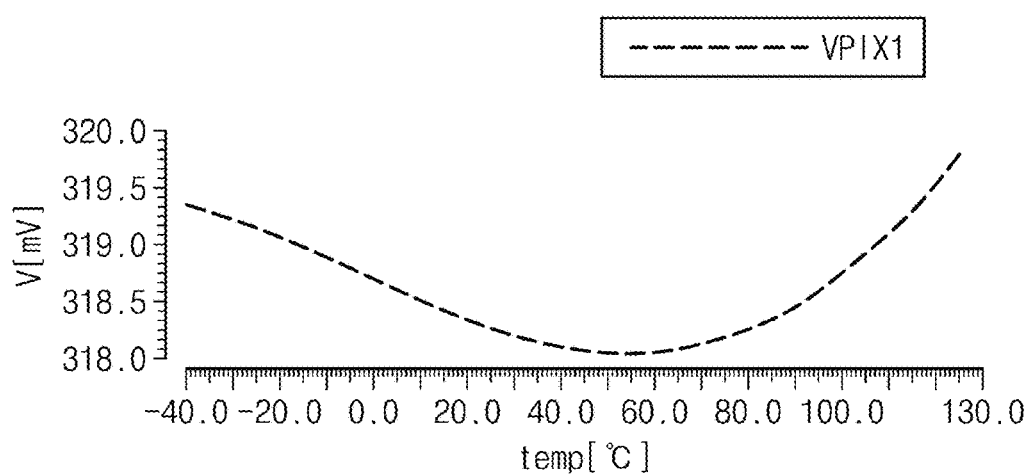

FIGS. 17A and 17B are graphs illustrating a change in a pixel voltage according to a temperature in an embodiment of the clamp voltage generating circuit 122 of FIG. 9 by using detailed numerical values. In FIG. 17A, a second pixel signal VPIX2 shows a voltage level of a pixel signal in the situation assumed in FIG. 16. The description given with reference to FIG. 16 will be omitted to avoid redundancy.

Referring to FIGS. 5, 6, 9, and 17A, according to an embodiment of the present disclosure, the clamp voltage generating circuit 122 may output the clamp voltage VCLP having the CTAT characteristic. Accordingly, even though the threshold voltage $V_{TH}$ of the first select transistor ST1 has the CTAT characteristic, the pixel signal. VPIX may be insensitive to a temperature change. A first pixel signal VPIX1 of FIG. 17A indicates the pixel signal VPIX insensitive to a temperature change.

FIG. 17B shows an enlarged graph waveform of the first pixel signal VPIX1 illustrated in FIG. 17A. Referring to the graph of FIG. 17B, a voltage level of the pixel signal VPIX is about 318 mV at 50° C.; and a voltage level of the pixel signal VPIX is about 320 mV at 120° C. In other words, the voltage variation of the first pixel signal VPIX1 may be within 2 mV. Compared to the case where the voltage variation of the pixel signal VPIX in the situation assumed in FIG. 16 is about 60 mV, according to an embodiment of the present disclosure, the voltage variation of the pixel signal VPIX may be reduced as much as 30 times.

Figure 18A:
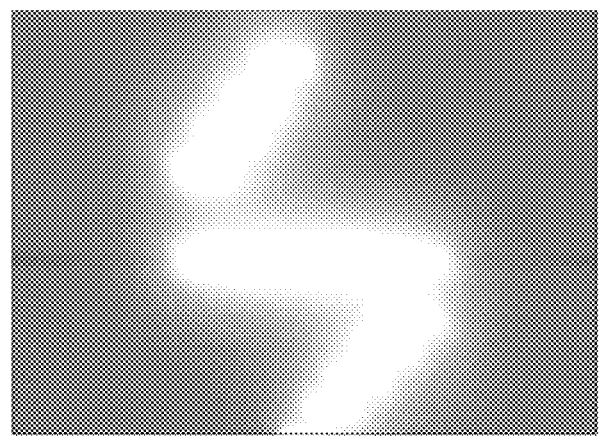
FIGS. 18A and 18B are diagrams illustrating processing results of an image sensor.
Figure 18B:
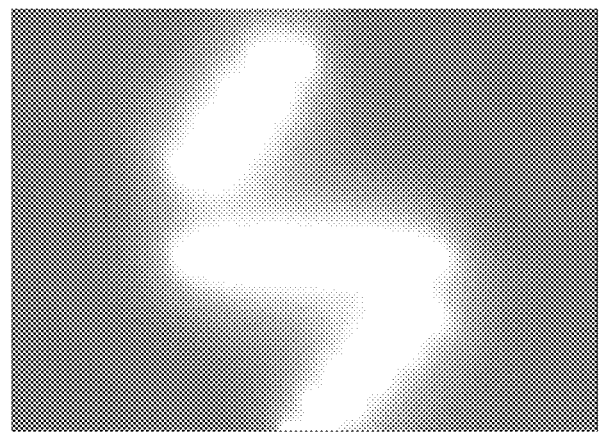

FIGS. 18A and 18B are diagrams illustrating processing results of an image sensor. Referring to FIGS. 2, 4B, 18A, and 18B, when an excessive light is incident onto the image sensor 100, the second output voltage VOUT2 may be clamped by the first output voltage VOUT1. However, when a voltage level of the pixel signal VPIX varied due to a temperature change, a voltage level input to the ADC block 140 may vary. The change of the voltage level input to the ADC block 140 may cause the excess of the dynamic range of the ADC block 140. When the change of the voltage level exceeds the dynamic range of the ADC block 140, a noise (e.g., a horizontal noise (HN)) may occur in the image data IDAT. FIG. 18A shows a processing result corresponding to the image data IDAT in an example in which the HN occurs at a low temperature.

To prevent the HN as shown in FIG. 18A, a level of the clamp voltage VCLP may be increased. FIG. 18B shows a processing result corresponding to the image data IDAT in an example in which the level of the clamp voltage VCLP is increased. However, in the case where the level of the clamp voltage VCLP increases to prevent the HN, a column fixed pattern noise (CFPN) may occur. In addition, in the case of decreasing a voltage level of the pixel signal VPIX or the amount of current of the current source IL, a processing speed of the image sensor 100 may become slow. According to an embodiment of the present disclosure, the clamp voltage generating circuit 122 may prevent the HN by reducing the fluctuations of the voltage level of the pixel signal VPIX insensitive to a temperature change without an increase in the voltage level of the clamp voltage VCLP.

Figure 19A:
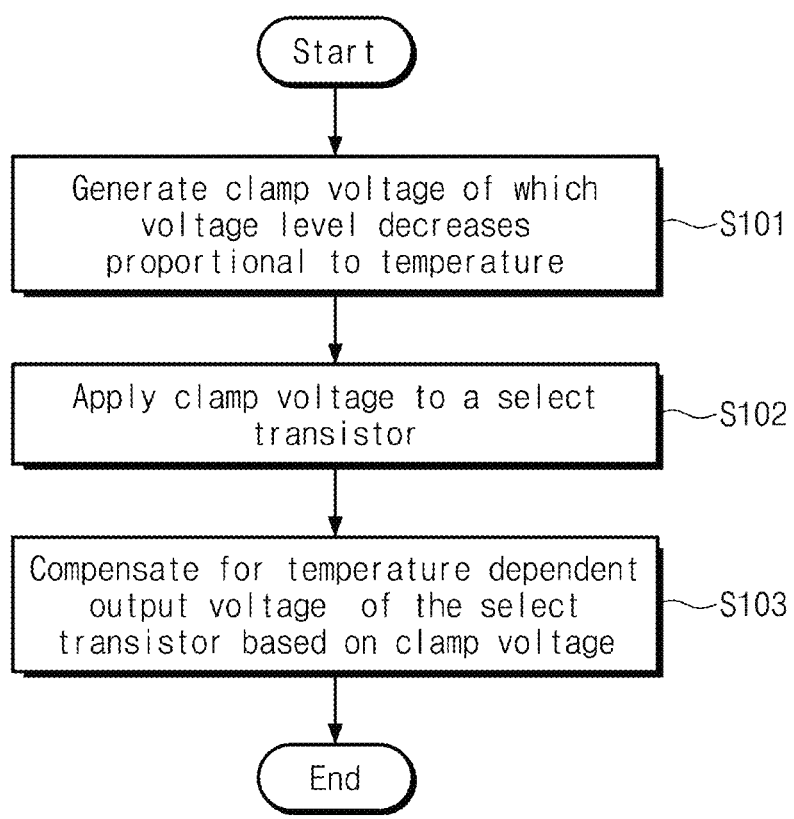
FIG. 19A is a flowchart illustrating an operating method of an electronic device according to an embodiment of the present disclosure.

FIG. 19A is a flowchart illustrating an operating method of an electronic device according to an embodiment of the present disclosure. For convenience of description, FIG. 19A will be described with reference to reference numerals/signs of FIGS. 4B and 9.

In operation S101, the clamp voltage generating circuit 122 may generate the clamp voltage VCLP having the CTAT characteristic. In other words, the clamp voltage VCLP may have a voltage level that decreases proportional to temperature. Here, the clamp voltage VCLP may have the CTAT characteristic by adjusting a resistance value of the bandgap reference circuit 122a.

In operation S102, the clamp voltage VCLP may be applied to the first select transistor ST1. In operation S103, the first select transistor ST1 may output the first output voltage VOUT1 that is smaller than the clamp voltage VCLP as much as a threshold voltage of the first select transistor ST1, which has the CTAT characteristic.

As described above, a change in the first output voltage VOUT1, which comes from the threshold voltage of the first select transistor ST1 when a temperature varies, may be compensated for based on the clamp voltage VCLP. The pixel signal VPIX may be generated based on the first output voltage VOUT1 and the second output voltage VOUT2. The pixel signal VPIX insensitive to a temperature may be transferred to the ADC block 140 (refer to FIG. 2).

Figure 19B:
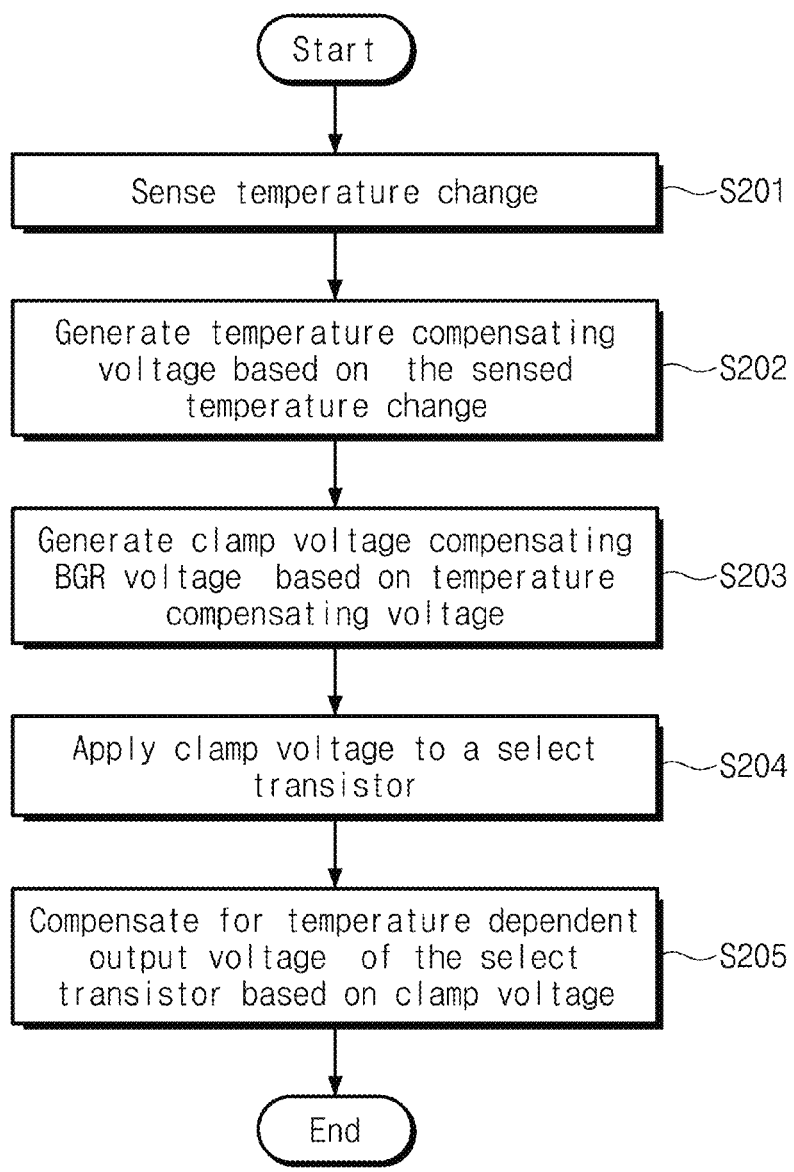
FIG. 19B is a flowchart illustrating an operating method of an electronic device according to an embodiment of the present disclosure.

FIG. 19B is a flowchart illustrating an operating method of an electronic device according to an embodiment of the present disclosure. For convenience of description, FIG. 19B will be described with reference to reference numerals/signs of FIGS. 5 and 11 to 13.

In operation S201, the clamp voltage generating circuit 122 may sense a temperature change based on the temperature signal TS. According to an embodiment of the present disclosure, the temperature signal TS may be received from the outside of the clamp voltage generating circuit 122. According to an embodiment of the present disclosure, the temperature signal TS may be provided as a result of measuring, a change in an internal voltage of the bandgap reference circuit 122a or may be provided from the separate temperature sensor 122e.

In operation S202, the temperature feedback circuit 122c may output the temperature compensation voltage VTC based on information about a temperature change that the temperature signal TS indicates.

In operation S203, the clamp voltage generating circuit 12 may generate the clamp voltage VCLP of the CTAT characteristic based on the BGR voltage VBGR and the temperature compensation voltage VTC.

In operation S204, the clamp voltage VCLP may be applied to the first select transistor ST1. In operation S205, the first select transistor ST1 may output the first output voltage VOUT1 that is smaller than the clamp voltage VCLP as much as a threshold voltage of the first select transistor ST1, which has the CTAT characteristic.

As described above, a change in the first output voltage VOUT1, which comes from the threshold voltage of the first select transistor ST1 when a temperature varies, may be compensated for based on the clamp voltage VCLP. The pixel signal VPIX may be generated based on the first output voltage VOUT1 and the second output voltage VOUT2. The pixel signal VPIX insensitive to a temperature may be transferred to the ADC block 140 (refer to FIG. 2).

Figure 20:
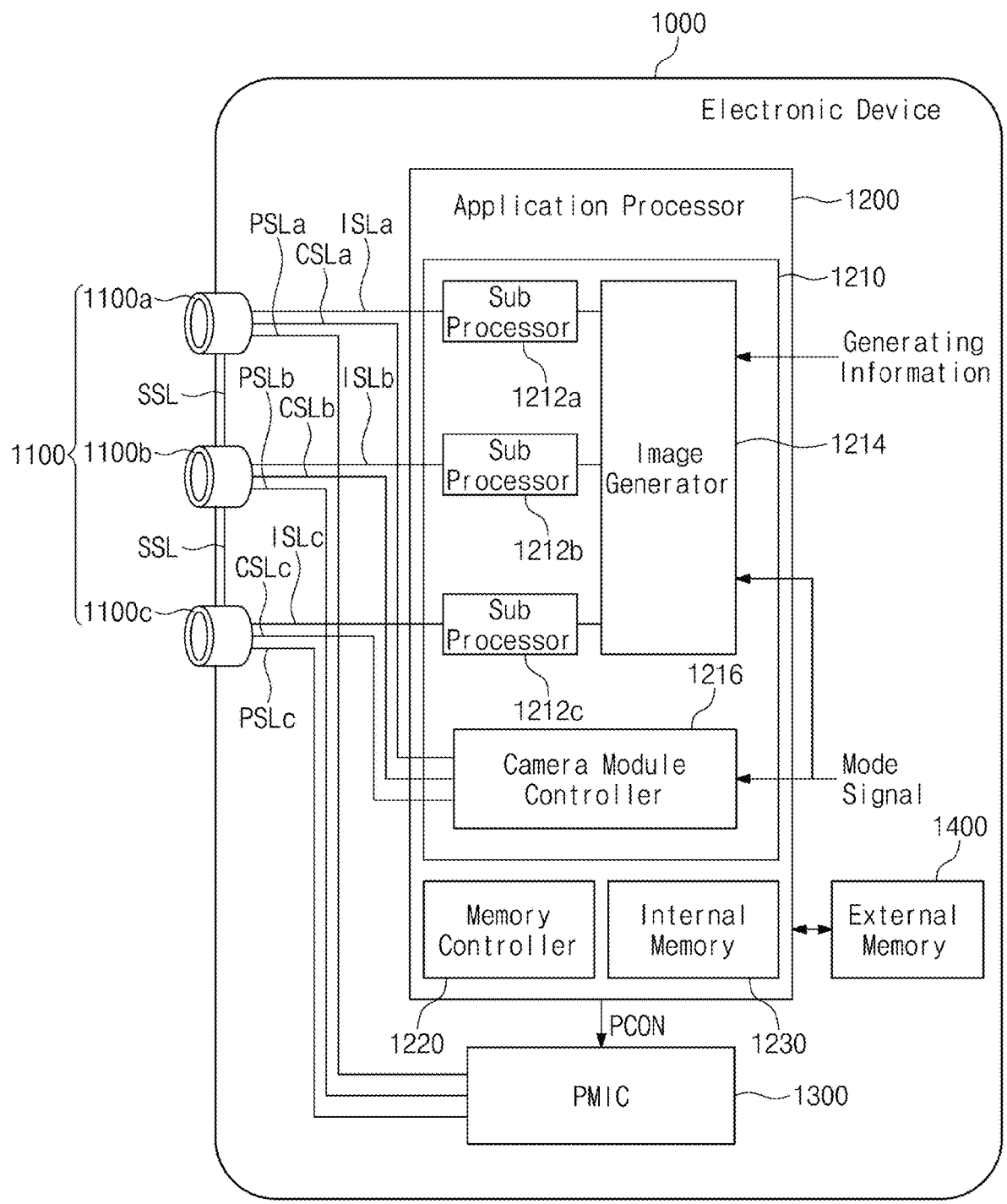
FIG. 20 illustrates a configuration of an electronic device including a camera module in which air image processing device according to an embodiment of the present disclosure is implemented.
Figure 21:
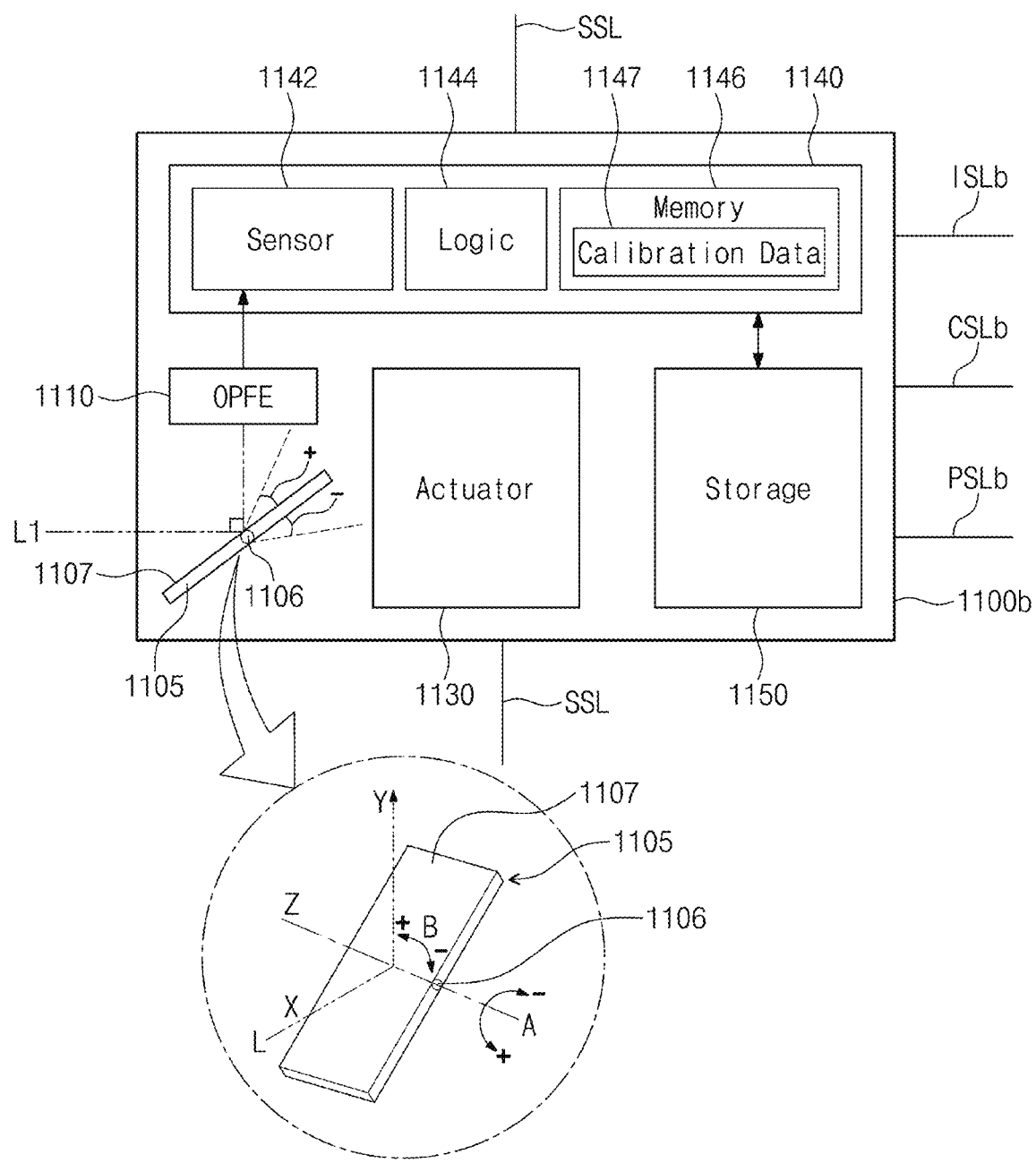
FIG. 21 illustrates a configuration of a camera module of FIG. 20.

FIG. 20 illustrates a configuration of an electronic device including a camera module in which an image processing device according to an embodiment of the present disclosure is implemented. FIG. 21 illustrates a configuration of a camera module of FIG. 20.

Referring to FIG. 20, an electronic device 1000 may include a camera module group 1100, an application processor 1200, a power management integrated circuit (PMIC) 1300, and an external memory 1400.

The camera module group 1100 may include a plurality of camera modules 1100a, 1100b, and 1100c. An electronic device including three camera modules 1100a, 1100b, and 1100c is illustrated in FIG. 20, but the present disclosure is not thereto. In some embodiments of the present disclosure, the camera module group 1100 may be modified to include only two camera modules. In addition, in some embodiments of the present disclosure, the camera module group 1100 may be modified to include "n" camera modules (n being a natural number of 4 or more).

Below, a detailed configuration of the camera module 1100b will be more fully described with reference to FIG. 21, but the following description may be equally applied to the remaining camera modules 1100a and 1100c.

Referring to FIG. 21, the camera module 1100b may include a prism 1105, an optical path folding element (OPFE) 1110, an actuator 1130, an image sensing device 1140, and storage 1150.

The prism 1105 may include a reflecting plane 1107 of a light reflecting material and may change a path of a light "L" incident from the outside.

In some embodiments, the prism 1105 may change a path of light "L" incident in a first direction "X" to a second direction "Y" perpendicular to the first direction "X". In addition, the prism 1105 may change the path of the light "L" incident in the first direction "X" to the second direction "Y" perpendicular to the first direction "X" by rotating the reflecting plane 1107 of the light reflecting material in direction "A" about a central axis 1106 or rotating the central axis 1106 in direction "B". In this case, the OPFE 1110 may move in a third direction "Z" perpendicular to the first direction "X" and the second direction "Y".

In some embodiments of the present disclosure, as illustrated, a maximum rotation angle of the prism 1105 in direction "A" may be equal to or smaller than 15 degrees in a positive A direction and may be greater than 15 degrees in a negative A direction, but the present disclosure is not limited thereto.

In some embodiments of the present disclosure, the prism 1105 may move within approximately 20 degrees in a positive or negative B direction, between 10 degrees and 20 degrees, or between 15 degrees and 20 degrees; here, the prism 1105 may move at the same angle in the positive or negative B direction or may move at a similar angle within approximately 1 degree.

In some embodiments of the present disclosure, the prism 1105 may move the reflecting plane 1107 of the light reflecting material in the third direction (e.g., a Z direction) parallel to a direction in which the central axis 1106 extends.

The OPFE 1110 may include optical lenses composed of "m" groups (m being a natural number), for example. Here, "m" lens may move in the second direction "Y" to change an optical zoom ratio of the camera module 1100b. For example, when a default optical zoom ratio of the camera module 1100b is "Z", the optical zoom ratio of the camera module 1100b may be changed to an optical zoom ratio of 3Z, 5Z, or 5Z or more by moving "m" optical lens included in the OPFE 1110.

The actuator 1130 may move the OPFE 1110 or an optical lens (hereinafter referred to as an "optical lens") to a specific location. For example, the actuator 1130 may adjust a location of an optical lens such that an image sensor 1142 is placed at a focal length of the optical lens for accurate sensing.

The image sensing device 1140 may include the image sensor 1142, control logic 1144, and a memory 1146. The image sensor 1142 may sense an image of a sensing target by using the light "L" provided through an optical lens. For example the image sensor 1142 may include a plurality of pixels, and some of the plurality of pixels may operate as a clamp circuit. In addition, a voltage level of a signal that each of the pixels outputs may be insensitive to a temperature change. The control logic 1144 may control overall operations of the camera module 1100b. For example, the control logic 1144 may control an operation of the camera module 1100b based on a control signal provided through a control signal line CSLb.

The memory 1146 may store information, which is necessary for an operation of the camera module 1100b, such as calibration data 1147. The calibration data 1147 may include information necessary for the camera module 1100b to generate image data by using the light "L" provided from the outside. The calibration data 1147 may include, for example, information about the degree of rotation described above, information about a focal length, information about an optical axis, etc. In the case where the camera module 1100b is implemented in the form of a multi-state camera in which a focal length varies depending on a location of an optical lens, the calibration data 1147 may include a focal length value for each location (or state) of the optical lens and information about auto focusing.

The storage 1150 may store image data sensed through the image sensor 1142. The storage 1150 may be disposed outside the image sensing device 1140 and may be implemented in a shape where the storage 1150 and a sensor chip constituting the image sensing device 1140 are stacked. In some embodiments of the present disclosure, the storage 1150 may be implemented with an electrically erasable programmable read only memory (EEPROM), but the present disclosure is not limited thereto.

Referring together to FIGS. 20 and 21, in some embodiments of the present disclosure, each of the plurality of camera modules 1100a, 1100b, and 1100c may include the actuator 1130. As such, the same calibration data 1147 or different calibration data 1147 may be included in the plurality of camera modules 1100a, 1100b, and 1100c depending on operations of the actuators 1130 therein.

In some embodiments of the present disclosure, one camera module (e.g., 1100b) among the plurality of camera modules 1100a, 1100b, and 1100c may be a folded lens shape of camera module in which the prism 1105 and the OPFE 1110 described above are included, and the remaining camera modules (e.g., 1100a and 1100c) may be a vertical shape of camera module in which the prism 1105 and the OPFE 1110 described above are not included; however, the present disclosure is not limited thereto.

In some embodiments of the present disclosure, one camera module (e.g., 1100c) among the plurality of camera modules 1100a, 1100b, and 1100c may be, for example, a vertical shape of depth camera extracting depth information by using an infrared ray (IR). In this case, the application processor 1200 may merge image data provided from the depth camera and image data provided from any other camera module (e.g., 1100a or 1100b) and may generate a three-dimensional (3D) depth image.

In some embodiments of the present disclosure, at least two camera modules (e.g., 1100a and 1100b) among the plurality of camera modules 1100a, 1100b, and 1100c may have different fields of view. In this case, the at least two camera modules (e.g., 1100a and 1100b) among the plurality of camera modules 1100a, 1100b, and 1100c may include different optical lens, not limited thereto.

In addition, in some embodiments of the present disclosure, fields of view of the plurality of camera modules 1100a, 1100b, and 1100c may be different. In this case, the plurality of camera modules 1100a, 1100b, and 1100c may include different optical lens, not limited thereto.

In some embodiments of the present disclosure, the plurality of camera modules 1100a, 1100b, and 1100c may be disposed to be physically separated from each other. In other words, the plurality of camera modules 1100a, 1100b, and 1100c may not use a sensing area of one image sensor 1142, hut the plurality of camera modules 1100a, 11.00b, and 1100c may include independent image sensors 1142 therein, respectively.

Returning to FIG. 20, the application processor 1200 may include an image processing device 1210, a memory controller 1220, and an internal memory 1230. The application processor 1200 may be implemented to be separated from the plurality of camera modules 1100a, 1100b, and 1100c. For example, the application processor 1200 and the plurality of camera modules 1100a, 1100b, and 1100c may be implemented with separate semiconductor chips.

The image processing device 1210 may include a plurality of sub image processors 1212a, 1212b, and 1212c, an image generator 1214, and a camera module controller 1216. The image processing device 1210 may include the plurality of sub image processors 1212a, 1212b, and 1212c, the number of which corresponds to the number of the plurality of camera modules 1100a, 1100b, and 1100c.

Image data respectively generated from the camera modules 1100a, 1100b, and 1100c may be respectively provided to the corresponding sub image processors 1212a, 1212b, and 1212c through separated image signal lines ISLa, ISLb, and ISLc. For example, the image data generated from the camera module 1100a may be provided to the sub image processor 1212a through the image signal line ISLa, the image data generated from the camera module 1100b may be provided to the sub image processor 1212b through the image signal line ISLb, and the image data generated from the camera module 1100c may be provided to the sub image processor 1212c through the image signal line ISLc. This image data transmission may be performed, for example, by using a camera serial interface (CSI) based on the MIPI (Mobile Industry Processor Interface), but the present disclosure is not limited thereto.

In addition, in some embodiments of the present disclosure, one sub image processor may be disposed to correspond to a plurality of camera modules. For example, the sub image processor 1212a and the sub image processor 1212c may be integrally implemented, not separated from each other as illustrated in FIG. 12; in this case, one of the pieces of image data respectively provided from the camera module 1100a and the camera module 1100c may be selected through a selection element (e.g., a multiplexer), and the selected image data may be provided to the integrated sub image processor.

The image data respectively provided to the sub image processors 1212a, 1212b, and 1212c may be provided to the image generator 1214. The image generator 1214 may generate an output image by using the it rage data respectively provided from the sub image processors 1212a, 1212b, and 1212c, depending on image generating information (Generating Information) or a mode signal (Mode Signal).

For example, the image generator 1214 may generate the output image by merging at least a portion of the image data respectively generated from the camera modules 1100a, 1100b, and 1100c having different fields of view, depending on the image generating information (Generating Information) or the mode signal (Mode Signal). In addition, the image generator 1214 may generate the output image by selecting one of the image data respectively generated from the camera modules 1100a, 1100b, and 1100c having afferent fields of view, depending on the image generating information (Generating Information) or the mode signal (Mode Signal).

In some embodiments of the present disclosure, the image generating information (Generating Information) may include a zoom signal or a zoom factor. In addition, in some embodiments of the present disclosure, the mode signal (Mode Signal) may be, for example, a signal based on a mode selected from a user.

In the case where the image generating information (Generating Information) is the zoom signal (or zoom factor) and the camera modules 1100a, 1100b, and 1100c have different visual fields of view, the image generator 1214 may perform different operations depending on a kind of the zoom signal. For example, in the case where the zoom signal is a first signal, the image generator 1214 may merge the image data output from the camera module 1100a and the image data output from the camera module 1100c and may generate the output image by using the merged image signal and the image data output from the camera module 1100b that is not used in the merging operation.

In the case where the zoom signal is a second signal different from the first signal, without the image data merging operation, the image generator 1214 may select one of the image data respectively output from the camera modules 1100a, 1100b, and 1100c and may output the selected image data as the output image. However, the present disclosure is not limited thereto, and a way to process image data may be modified without limitation if necessary.

In some embodiments of the present disclosure, the image generator 1214 may generate merged image data having an increased dynamic range by receiving a plurality of image data of different exposure times from at least one of the plurality of sub image processors 1212a, 1212b, and 1212c and performing high dynamic range (HDR) processing on the plurality of image data.

The camera module controller 1216 may provide control signals to the camera modules 1100a, 1100b, and 1100c, respectively. The control signals generated from the camera module controller 1216 may be respectively provided to the corresponding camera modules 1100a, 1100b, and 1100c through control signal lines CSLa, CSLb, and CSLc separated from each other.

One of the plurality of camera modules 1100a, 1100b, and 1100c may be designated as a master camera (e.g., 1100b) depending on the image generating information (Generating Information) including a zoom signal or the mode signal (Mode Signal), and the remaining camera modules (e.g., 1100a and 1100c) may be designated as a slave camera. The above designation information may be included in the control signals, and the control signals including the designation information may be respectively provided to the corresponding camera modules 1100a, 1100b, and 1100c through the control signal lines CSLa, CSLb, and CSLc separated from each other.

Camera modules operating as a master and a slave ma be changed depending on the zoom factor or an operating mode signal. For example, in the ease where the field of view of the camera module 1100a is wider than the field of view of the camera module 1100b and the zoom factor indicates a low zoom ratio, the camera module 1100b may operate as a master, and the camera module 1100a may operate as a slave. In contrast, in the case where the zoom factor indicates a high zoom ratio, the camera module 1100a may operate as a master, and the camera module 1100b may operate as a slave.

In some embodiments of the present disclosure, the control signal provided from the camera module controller 1216 to each of the camera modules 1100a, 1100b, and 1100c may include a sync enable signal. For example, in the case where the camera module 1100b is used as a master camera and the camera modules 1100a and 1100c are used as a slave camera, the camera module controller 1216 may transmit the sync enable signal to the camera module 1100b. The camera module 1100b that is provided with sync enable signal may generate a sync signal based on the provided sync enable signal and may provide the generated sync signal to the camera modules 1100a and 1100c through a sync signal line SSL. The camera module 1100b and the camera modules 1100a and 1100c may be synchronized with the sync signal to transmit image data to the application processor 1200.

In some embodiments of the present disclosure, the control signal provided from the camera module controller 1216 to each of the camera modules 1100a, 1100b, and 1100c may include mode information according to the mode signal. Based on the mode information, the plurality of camera modules 1100a, 1100b, and 1100c may operate in a first operating mode and a second operating mode with regard to a sensing speed.

In the first operating mode, the plurality of camera modules 1100a, 1100b, and 1100c may generate image signals at a first speed (e.g., may generate image signals of a first frame rate), may encode the image signals at a second speed (e.g., may encode the image signal of a second frame rate higher than the first frame rate), and transmit the encoded image signals to the application processor 1200. In this case, the second speed may be 30 times or less the first speed.

The application processor 1200 may store the received image signals, in other words, the encoded image signals in the internal memory 1230 provided therein or the external memory 1400 placed outside the application processor 1200. Afterwards, the application processor 1200 may read and decode the encoded image signals from the internal memory 1230 or the external memory 1400 and may display image data generated based on the decoded image signals. For example, the corresponding one among sub image processors 1212a, 1212b, and 1212c of the image processing device 1210 may perform decoding and may also perform image processing on the decoded image signal.

In the second operating mode, the plurality of camera modules 1100a, 1100b, and 1100c may generate image signals at a third speed (e.g., may generate image signals of a third frame rate lower than the first frame rate) and transmit the image signals to the application processor 1200. The image signals provided to the application processor 1200 may be signals that are not encoded. The application processor 1200 may perform image processing on the received image signals or may store the image signals in the internal memory 1230 or the external memory 1400.

The PMIC 1300 may supply powers, for example, power supply voltages to the plurality of camera modules 1100a, 1100b, and 1100c, respectively. For example, wider control of the application processor 1200, the PMIC 1300 may supply a first power to the camera module 1100a through a power signal line PSLa, may supply a second power to the camera module 1100b through a power signal line PSLb, and may supply a third power to the camera module 1100c through a power signal line PSLc.

In response to a power control signal PCON from the application processor 1200, the PMIC 1300 may generate a power corresponding to each of the plurality of camera modules 1100a, 1100b, and 1100c and may adjust a level of the power. The power control signal PCON may include a power adjustment signal for each operating mode of the plurality of camera modules 1100a, 1100b, and 1100c. For example, the operating mode may include a low-power mode. In this case, the power control signal PCON may include information about a camera module operating in the low-power mode and a set power level. Levels of the powers respectively provided to the plurality of camera modules 1100a, 1100b, and 1100c may be identical to each other or may be different from each other. In addition, a level of a power may be dynamically changed.

According to an embodiment of the present disclosure, it is possible to generate a pixel signal insensitive to a temperature change, and it is possible to provide an image whose quality is increased without changing an ADC dynamic range.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An image sensor, comprising:
a pixel array including a first pixel and a second pixel, wherein the first pixel and the second pixel are connected to a column line;

a row driver configured to provide the first pixel with a first selection signal based on a clamp voltage, and to provide the second pixel with a second selection signal based on a selection voltage, wherein the first pixel outputs a first output voltage in response to the first selection signal, and the second pixel outputs a second output voltage in response to the second selection signal, wherein the first output voltage and the second output voltage are output as a pixel signal through the column line, wherein a voltage of the pixel signal corresponds to a voltage obtained by clamping the second output voltage with the first output voltage, and wherein a change in a voltage level of the first output voltage due to a temperature is compensated for by the clamp voltage.

2. The image sensor of claim 1, further comprising:
a clamp voltage generating circuit configured to generate the clamp voltage.

3. The image sensor of claim 2, wherein the clamp voltage generating circuit includes:
a bandgap reference circuit configured to generate a first voltage; and
a buffer circuit configured to generate the clamp voltage based on the first voltage.

4. The image sensor of claim 3, wherein a voltage level of the first voltage decreases as the temperature increases.

5. The image sensor of claim 3, wherein the clamp voltage generating circuit further includes:
a temperature feedback circuit configured to generate a second voltage based on a temperature signal including information about a temperature change and to adjust the second voltage to correspond to the temperature change, and
wherein, as the temperature increases, a voltage level of the clamp voltage is decreased by the first voltage and the second voltage.

6. The image sensor of claim 1, wherein the first pixel includes a first select transistor connected with the column line,
wherein the second pixel includes a second select transistor connected with the column line,
wherein the row driver provides the first selection signal, which is based on the clamp voltage, to a gate terminal of the first select transistor and provides the second selection signal, which is based on the selection voltage, to a gate terminal of the second select transistor,
wherein the first select transistor has a threshold voltage, a voltage level of which decreases as the temperature increases, and
wherein a change in the voltage level of the first output voltage due to a variation in the temperature, is compensated for by the clamp voltage.

7. The image sensor of claim 1, wherein the row driver includes:
a selection controller configured to provide the clamp voltage or the selection voltage based on a plurality of control signals.

8. An electronic circuit, comprising:
a clamp voltage generating circuit configured to generate a first voltage, wherein a voltage level of the first voltage decreases as a temperature increases; and
a transistor directly connected to a column line of a pixel array and configured to output a second voltage based on the first voltage, wherein a voltage level of a threshold voltage of the transistor decreases as the temperature increases,
wherein a change in a voltage level of the second voltage, which results from a change in the temperature, is compensated for by using the first voltage.

9. The electronic circuit of claim 8, wherein the clamp voltage generating circuit includes:
a bandgap reference circuit configured to generate a third voltage; and
a buffer circuit configured to generate the first voltage based on the third voltage.

10. The electronic circuit of claim 9, wherein a voltage level of the third voltage decreases as the temperature increases.

11. The electronic circuit of claim 9, wherein the clamp voltage generating circuit includes:
a temperature feedback circuit configured to generate a fourth voltage based on a temperature signal including information about a temperature change.

12. The electronic circuit of claim 11, wherein the temperature feedback circuit adjusts a level of the fourth voltage to correspond to temperature change, and
wherein, as the temperature increases, a voltage level of the first voltage is decreased by the third voltage and the fourth voltage.

13. The electronic circuit of claim 11, further comprising:
a temperature sensor configured to sense the temperature change and to generate the temperature signal.

14. The electronic circuit of claim 13, wherein the temperature sensor includes a thermocouple, a resistance thermometer, a thermistor, an integrated circuit temperature sensor, a magnetic temperature sensor, a thermopile, or a pyroelectric temperature sensor.

15. The electronic circuit of claim 9, wherein the bandgap reference circuit includes:
a first current generator including a first resistor, and configured to generate a first current proportional to the temperature;
a second current generator configured to output a second current that is a mirrored version of the first current to an output node at which the first voltage is formed;
a second resistor connected with the output node, and configured to receive the second current; and
a bipolar junction transistor connected with the second resistor.

16. The electronic circuit of claim 15, wherein the clamp voltage generating circuit further includes:
a temperature feedback circuit configured to generate a fourth voltage based on a temperature signal including information about a temperature change,
wherein a voltage level of a voltage across the second resistor increases as the temperature increases, and
wherein the temperature change is sensed based on the increased voltage level.

17. The electronic circuit of claim 15, wherein a voltage level of the third voltage decreases as the temperature increases.

18. An operating method of an electronic device, comprising:
generating a clamp voltage, wherein a voltage level of the clamp voltage decreases as a temperature increases;
applying the clamp voltage to a transistor that is directly connected to a column line of a pixel array, wherein a voltage level of a threshold voltage of the transistor decreases as the temperature increases; and compensating for a change in a voltage level of an output voltage of the transistor, which is due to a change in the threshold voltage, based on the clamp voltage.

19. The method of claim 18, wherein the generating of the clamp voltage includes:
sensing a temperature change;
generating a temperature compensation voltage based on the temperature change; and
generating the clamp voltage based on the temperature compensation voltage and a first voltage that a bandgap reference circuit generates.

20. The method of claim 19, wherein the temperature change is based on a change in a voltage level of an internal voltage of the bandgap reference circuit.

* * * * *